United States Patent
Kakutani et al.

(10) Patent No.: US 8,767,264 B2
(45) Date of Patent: Jul. 1, 2014

(54) PRINTING DEVICE AND PRINTING METHOD

(75) Inventors: Toshiaki Kakutani, Nagano (JP); Takuma Hayashi, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 272 days.

(21) Appl. No.: 13/428,528

(22) Filed: Mar. 23, 2012

(65) Prior Publication Data

US 2012/0242734 A1 Sep. 27, 2012

(30) Foreign Application Priority Data

| Mar. 24, 2011 | (JP) | 2011-065682 |
| Apr. 13, 2011 | (JP) | 2011-088785 |
| Apr. 13, 2011 | (JP) | 2011-088789 |

(51) Int. Cl.
  *H04N 1/40* (2006.01)
  *H04N 1/405* (2006.01)
  *B41J 2/205* (2006.01)

(52) U.S. Cl.
  USPC ........... 358/3.01; 358/3.02; 358/3.06; 347/15

(58) Field of Classification Search
  USPC ............. 358/1.9, 3.06, 3.13, 3.03, 3.02, 3.09, 358/3.1, 3.11, 3.12, 3.01; 347/15, 589
  See application file for complete search history.

(56) References Cited

U.S. PATENT DOCUMENTS

| 5,341,228 | A | 8/1994 | Parker et al. |
| 7,557,960 | B2 * | 7/2009 | Ishida et al. ................ 358/3.02 |
| 2009/0116072 | A1 * | 5/2009 | Hiramoto et al. ........... 358/3.06 |
| 2010/0259793 | A1 | 10/2010 | Wakayama et al. |

FOREIGN PATENT DOCUMENTS

| JP | 2010-241052 A | 10/2010 |
| JP | 2010-241053 A | 10/2010 |
| JP | 2010-263618 A | 11/2010 |
| JP | 2011-121250 A | 6/2011 |
| JP | 2011-124744 A | 6/2011 |

* cited by examiner

*Primary Examiner* — Charlotte M Baker
(74) *Attorney, Agent, or Firm* — Global IP Counselors, LLP

(57) ABSTRACT

When dot data indicating whether or not a dot is formed on the basis of the gradation value for each pixel, dots belonging to a plurality of pixel groups having different printing conditions are printed in a common region in an overlapping manner, and the distribution of dots in the common region has a noise characteristic possessing a peak in the spatial frequency region on the high-frequency side. In a case where first and second pixels belonging to two pixel groups are proximal pixels in the common region in a predetermined gradation range in which probabilities k1 and k2 at which a dot is formed in the first and second pixels are such that k1<0.5 and k2<0.5, a probability K of a dot in both of the proximal pixels is set to be close to k1·k2.

12 Claims, 29 Drawing Sheets

MAIN SCANNING
DIRECTION
⟷

SECONDARY
SCANNING DIRECTION
↕

CASE OF APPROXIMATE SINGLE PIXEL SHIFT

CASE OF APPROXIMATE DOUBLE PIXEL SHIFT

SHIFT Δd IN REVERSE DIRECTION PRINTING POSITION
RELATIVE TO FORWARD DIRECTION PRINTING POSITION
(UNIT: PIXEL)

| Gradation Value S | Paired Dot Prediction Value H (S) | Paired Dot Prediction Value m (S) |
| --- | --- | --- |
| 0 | | |
| 1 | 0 | 0 |
| 2 | 0 | 0 |
| 3 | 0 | 0 |
| 4 | 1 | 0 |
| 5 | 1 | 1 |
| 6 | 2 | 1 |
| 7 | 3 | 2 |
| 8 | 4 | 3 |
| 9 | 5 | 4 |
| 10 | 6 | 5 |
| 11 | 7 | 6 |
| 12 | 9 | 7 |
| 13 | 10 | 8 |
| 14 | 12 | 9 |
| 15 | 14 | 11 |
| 16 | 16 | 12 |
| 17 | 18 | 14 |
| 18 | 20 | 16 |
| 19 | 22 | 18 |
| 20 | 25 | 20 |
| 21 | 27 | 22 |
| 22 | 30 | 24 |
| 23 | 33 | 26 |
| 24 | 36 | 29 |
| 25 | 39 | 31 |
| 26 | 42 | 34 |
| 27 | 45 | 36 |
| 28 | 49 | 39 |
| 29 | 52 | 42 |
| 30 | 56 | 45 |
| 31 | 60 | 48 |
| 32 | 64 | 51 |

Fig. 13

DOT DISTRIBUTION DURING FORWARD ACTION

DOT DISTRIBUTION DURING REVERSE ACTION

DOT DISTRIBUTION DURING SYNTHESIS

STORAGE ELEMENT CANDIDATE

PRINTING DEVICE AND PRINTING METHOD

CROSS-REFERENCE TO RELATED APPLICATIONS

This application claims priority to Japanese Patent Application No. 2011-065682 filed on Mar. 24, 2011, Japanese Patent Application No. 2011-088785 filed on Apr. 13, 2012 and Japanese Patent Application No. 2011-088789 filed on Apr. 13, 2011. The entire disclosures of Japanese Patent Application Nos. 2011-065682, 2011-088785 and 2011-088789 are hereby incorporated herein by reference.

BACKGROUND

1. Technical Field

The present invention relates to a printing device and a printing method.

2. Background Technology

A technology for reproducing multi-gradation images has been used in a printing device such as a printer in which one or more types of dots are recorded on a printing medium. There have recently been remarkable advances in multi-gradation technologies, and the formation of so-called photographic quality images can now be realized by combining two sizes of multi-colored dots such as cyan (C), magenta (M), yellow (Y), and black (K) and controlling the distribution of these dots. When attempts are made to reproduce a multi-gradation image with high image quality using fewer gradation values such as by forming or not forming dots (turning dots ON/OFF), controlling the distribution of dots properly becomes a problem. Because of advances in technologies for analyzing the distribution of these dots in a spatial frequency range, image quality can now be improved by maintaining in the dot distribution noise characteristics where the number of components at or below a predetermined frequency is kept as low as possible in a spatial frequency range.

Blue noise characteristics are typical of these noise characteristics. Blue noise refers, for example, to characteristics in which the spatial frequencies of an image formed uniformly of dots for reproducing an image having a constant gradation value include substantially no components at or below a predetermined frequency. While the human eye is sensitive to low-frequency characteristics below a certain level, high-frequency components are not very visible. For this reason, images with these blue noise characteristics have a smooth, high-quality feel. A well-known image formation technology having these blue noise characteristics has been disclosed in Patent Citation 1.

U.S. Pat. No. 5,341,228 (Patent Document 1) is an example of the related art.

SUMMARY

Problems to be Solved by the Invention

However, there are cases in which the highest quality images having blue noise characteristics are those in which dots are formed properly in dot formation positions obtained using image processing. In actual printing devices, with respect to the formation position of dots, dots can not be formed in the original formation position because of a variety of factors. For example, in inkjet printers which eject ink droplets from nozzles, the landing positions of ink droplets during dot formation can be different due to individual differences in each nozzle. Also, in printers which form dots while the print head used to form dots moves relative to a print medium such as printing paper, errors are known to occur in dot formation positions due to positioning errors in the print head. A typical error is an error that occurs in two-way printing in which dots are formed during forward action and during reverse action of the print head. Another similar well-known error is an error that occurs in the multi-pass printing method in which a single raster is formed by multiple passes in the main scanning direction.

A phenomenon is also known in which a shift occurs in the landing positions of ink droplets, that is, in the formation positions of dots, due to buckling of the printing medium, such as printing paper absorbing ink and buckling ("cockling"). A shift in the formation position of dots does not occur only in printing devices using ink droplets. They occur in any type of printer that forms dots in a given region by dividing them into a plurality of pixel groups, including thermal transfer printing devices, thermal sublimation printing devices, and so-called line printers in which a print head is arranged in the width direction of the paper.

Means Used to Solve the Above-Mentioned Problems

An advantage of the present invention is to solve at least some of these problems as realized in the embodiments and application examples below.

Application Example 1

A printing device for forming dots on a printing medium and printing an image, wherein
the printing device includes:
a dot data generating unit for receiving image data for an image to be printed, and generating and associating with each pixel dot data indicating whether or not a dot is to be formed on the basis of a gradation value for each pixel forming the image, and
a printing unit for printing the image, when dots are to be formed on the printing medium in accordance with the dot data, by dividing the formation of dots into a plurality of pixel groups having different printing conditions, and by performing at least a portion of the dot formation using the plurality of pixel groups in a common region;
the distribution of dots formed in the common region has a noise characteristic possessing a peak in the spatial frequency region on a higher-frequency side relative to a low-frequency region at or below a predetermined spatial frequency; and
in a case where first and second pixels belonging, respectively, to two pixel groups among the plurality of pixel groups are proximal pixels that are near to each other in the common region in a predetermined gradation range in which probabilities k1 and k2 at which a dot is formed in the first and second pixels are such that k1<0.5 and k2<0.5, a probability K of a dot being formed on both of the proximal pixels is set to be close to k1·k2.

In the first application example, the distribution of dots formed in the common region has a noise characteristic possessing a peak in the spatial frequency region on the higher-frequency side relative to the low-frequency region at or below a predetermined spatial frequency, the image to be printed has characteristics close to so-called blue noise characteristics and/or green noise characteristics at least in the common region, and the image to be printed can be realized with high quality. In addition, the rise in the probability of dot formation in proximal pixels can be suppressed even in a case in which a shift occurs in the formation positions of dots because the probability K of a dot being formed in both proximal pixels is set so as to be close to k1·k2. As a result, deterioration in image quality can be suppressed in a case in which a shift occurs in dot formation positions.

Application Example 2

The printing device according to the first aspect, wherein
the probability K of a dot being formed in both proximal pixels is set to be closer to k1·k2 in a case in which the size of a printing region in the printing medium is equal to or greater than a first predetermined value than in a case in which the size of a printing region in the printing medium is less than the first predetermined value or a second predetermined value that is smaller than the predetermined value.

In the printing device of the second application example, a rise in the probability of a dot being formed in a proximal pixel can be suppressed in a case in which the printing region on the printing medium is large, even in a case in which a shift occurs in the dot formation position. As a result, it is possible to generate dot data in which the ratio at which dots are formed in adjacent pixels does not change significantly in a case in which the printing region on the printing medium is large, even if a shift occurs in the dot formation position.

Application Example 3

The printing device according to the first or second aspect, wherein
whether or not to form a dot is decided by comparing the gradation value of each pixel to each threshold value of a dither mask prepared in advance; and
the probability K of a dot being formed in both proximal pixels is set to be close to k1·k2 in a case in which the threshold value when determining whether or not to form a dot in the common region has noise characteristics and the first and second pixels are proximal pixels that are near to each other in the common region within a predetermined gradation range.

In the printing device of the third application example, whether or not to form a dot is decided using a dither mask including the threshold values mentioned above. As a result, the advantages of the dither method, such as high-speed determination for dot formation, can be fully realized, and deterioration in image quality can be suppressed in a case in which a shift in the formation position of dots occurs.

Application Example 4

The printing device in any of the first through third aspects, wherein
the printing unit performs a reciprocating action with respect to a main scanning direction, and prints the image during both main scanning in the forward action and main scanning in the reverse action; and
the first pixel group to which the first pixel belongs is a group of pixels in which dots are formed by main scanning in the forward action, and the second pixel group to which the second pixel belongs is a group of pixels in which dots are formed by main scanning in the reverse action.

In the printing device of the fourth application example, a rise in the probability of a dot being formed in a proximal pixel can be suppressed even when a shift occurs in the position of dots formed by main scanning in the forward action and during main scanning in the reverse action. Therefore, the advantages of the reciprocating printing (bi-directional printing), such as shorter printing times, can be fully realized, and high quality can be maintained for images in which printing is performed in the common region.

In the printing device of the fourth application example, so-called bi-directional printing can be performed, and the rise in the probability of a dot being formed in a proximal pixel can be suppressed, even in cases in which a shift in the formation position of dots occurs during bi-directional printing. As a result, deterioration in image quality can be suppressed in cases in which a shift in the formation position of dots occurs.

Application Example 5

The printing device of the fourth aspect, wherein
the dots formed by main scanning in the forward action and the dots formed by main scanning in the reverse action are arranged in an alternating manner in both the main scanning direction and a secondary scanning direction intersecting the main scanning direction; and
the proximal pixels are a combination of one pixel and another pixel adjacent to the pixel in the main scanning direction, and a combination of a pixel and another pixel adjacent to the pixel in the secondary scanning direction.

Application Example 6

The printing device of the fourth aspect, wherein
the dots formed by main scanning in the forward action and the dots formed by main scanning in the reverse action are arranged in an alternating manner in the main scanning direction, and are arranged so that the dots formed by main scanning in the forward action or the dots formed by main scanning in the reverse action are contiguous in a secondary scanning direction intersecting the main scanning direction; and
the proximal pixels are a combination of one pixel and another pixel adjacent to one side of the one pixel in the main scanning direction, and a combination of the one pixel and pixels adjacent to the adjacent pixel on either side in the secondary scanning direction.

Application Example 7

The printing device of the fourth aspect, wherein
the dots formed by main scanning in the forward action and the dots formed by main scanning in the reverse action are arranged in an alternating manner in a secondary scanning direction intersecting the main scanning direction, and are arranged so that the dots formed by main scanning in the forward action or the dots formed by main scanning in the reverse action are contiguous in the main scanning direction; and
the proximal pixels are a combination of one pixel and another pixel adjacent to one side of the one pixel in the main scanning direction, and a combination of the one pixel and pixels adjacent to the adjacent pixel on either side in the main scanning direction.

In the printing devices of the fifth through seventh application examples, it can be identified whether or not formation isolation control has been performed on proximal pixels in any direction, in cases in which the arrangement of dots formed by main scanning in the forward action and main scanning in the reverse action is a so-called crossed arrangement (Application Example 5), an alternating column arrangement (Application Example 6), or an alternating raster arrangement (Application Example 7). In these combinations, any change in the probability of dots being formed in adjacent pixels can be suppressed, and any deterioration in image quality caused by a shift in the formation position of dots can be suppressed, even in a case in which a shift in the position of dots formed by main scanning in the forward action and main scanning in the reverse action.

Application Example 8

The printing device in any of the first through third aspects, wherein the printing unit forms dots while performing main scanning in the main scanning direction, and prints the image by performing the main scanning operation a plurality of times; and the first pixel group to which the first pixel belongs and the second pixel group to which the second pixel belongs are groups of pixels in which dots are formed during different main scanning operations among the main scanning operations performed a plurality of times.

In the printing device of the eighth application example, any change in the probability of dots being formed in proximal pixels can be suppressed, and any deterioration in image quality caused by a shift in the formation position of dots can be suppressed, even in a case in which a shift in the position of dots formed during different main scanning actions occurs in so-called multi-pass printing.

Application Example 9

The printing device in any of any of the first through eighth aspects, wherein the probability K is within the range $k1 \cdot k2 - 0.2 < K < k1 \cdot k2$.

In the printing device of the ninth application example, in a case in which the average probability of a dot being formed in a given first pixel and second pixel with a predetermined gradation value is k1, k2, the probability K of a dot being formed in both proximal pixels can be brought sufficiently close to the probability $k1 \cdot k2$ in a case in which the dot formation probability has not been adjusted in accordance with the dot arrangement. As a result, any degree of discrepancy in the formation position of dots can be addressed, and any deterioration in image quality in these cases can be suppressed.

Application Example 10

The printing device in any of the first through ninth aspects, wherein the predetermined gradation range is $0 < k1 < 0.2$, and $0 < k2 < 0.2$.

In the printing device of the tenth application example, the gradation range in which the probability of dot formation in both proximal pixels is brought close to $k1 \cdot k2$ is set on the low density side. As a result, any decline in graininess can be suppressed even when a shift in the formation position of dots occurs.

Application Example 11

The printing device in any of the first through tenth aspects, Wherein probabilities k1 and k2 are both k, and probability k is close to $k^2$.

In the printing device of the eleventh application example, the probability of dot formation is handled in the same manner for the first pixel group and the second pixel group. As a result, the process can be simplified.

Application Example 12

A printing method for forming dots on a printing medium and printing an image, wherein the printing method includes:

a step for receiving image data for an image to be printed, and generating and associating with each pixel dot data indicating whether or not a dot is to be formed on the basis of a gradation value for each pixel forming the image, and a step for printing the image, when dots are to be formed on the printing medium in accordance with the dot data, by dividing the formation of dots into a plurality of pixel groups having different printing conditions, and by performing at least a portion of the dot formation using the plurality of pixel groups in a common region;

the distribution of dots formed in the common region has a noise characteristic possessing a peak in the spatial frequency region on a higher-frequency side relative to a low-frequency region at or below a predetermined spatial frequency; and in a case where first and second pixels belonging, respectively, to two pixel groups among the plurality of pixel groups are proximal pixels that are near to each other in the common region in a predetermined gradation range in which probabilities k1 and k2 at which a dot is formed in the first and second pixels are such that k1<0.5 and k2<0.5, a probability K of a dot being formed on both of the proximal pixels is set to be close to $k1 \cdot k2$.

In the twelfth application example, as in the first application example, dot formation can be controlled so that the distribution of dots formed in the common region has a noise characteristic possessing a peak in the spatial frequency region on the higher-frequency side relative to the low-frequency region at or below a predetermined spatial frequency, and the image to be printed has characteristics close to so-called blue noise characteristics and/or green noise characteristics at least in the common region. As a result, the image to be printed can be realized with high quality using this data for dot formation. In addition, the rise in the probability of dot formation in proximal pixels can be suppressed even in a case in which a shift occurs in the formation positions of dots because the probability K of a dot being formed in both proximal pixels is set so as to be close to $k1 \cdot k2$. As a result, deterioration in image quality can be suppressed in a case in which a shift occurs in dot formation positions.

BRIEF DESCRIPTION OF THE DRAWINGS

Referring now to the attached drawings which form a part of this original disclosure:

FIG. 13 is a descriptive diagram showing the relationship between gradation values S and paired dot target values M;

DETAILED DESCRIPTION OF EXEMPLARY EMBODIMENTS

A. First Embodiment

The first embodiment of the present invention will now be described.

A-1. Device Configuration

Figure 1:
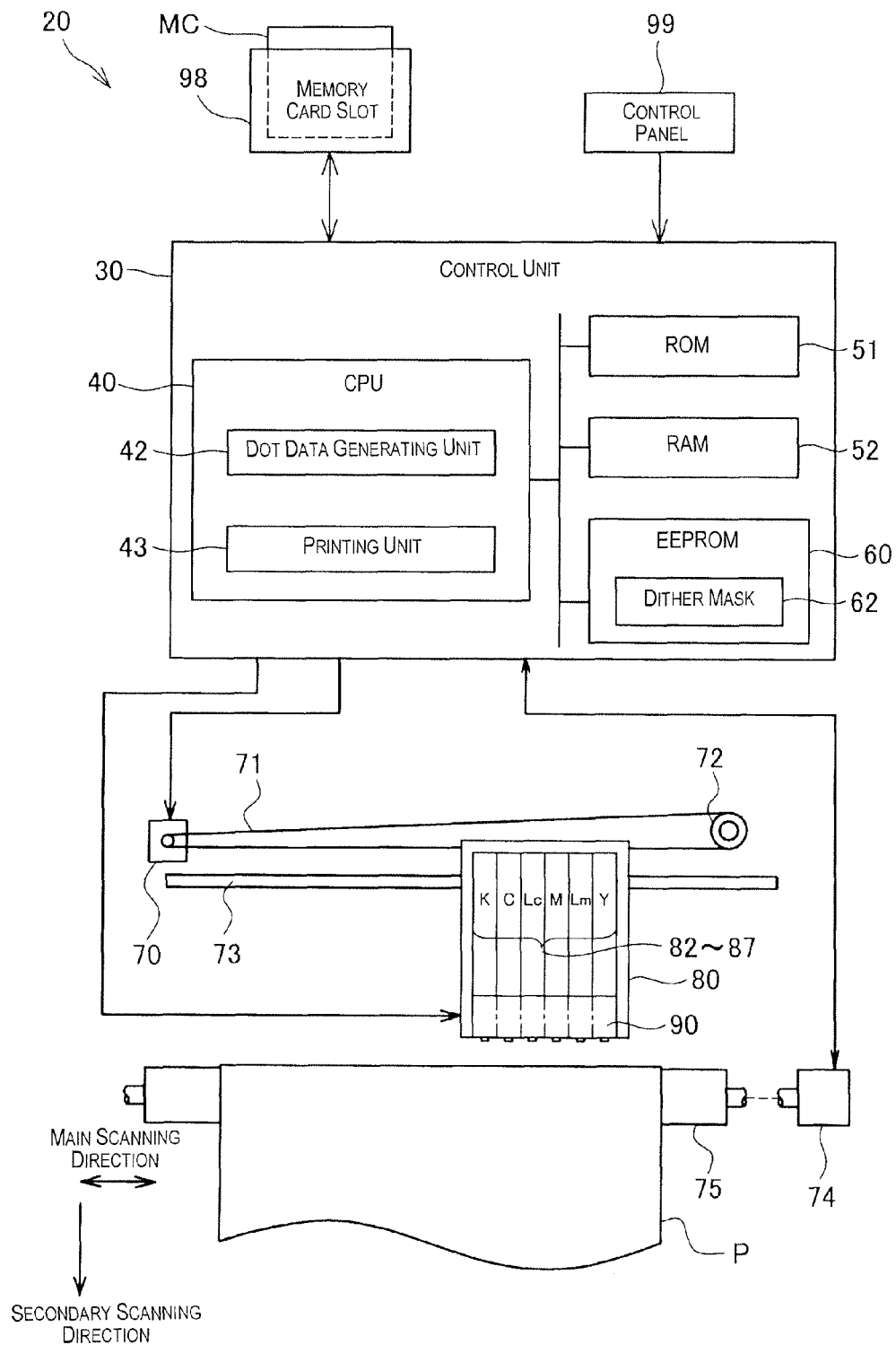
FIG. 1 is a schematic block diagram of the printer 20 in an embodiment of the present invention.

FIG. 1 is a schematic block diagram of the printer 20 in the embodiment of the present invention. The printer 20 is a serial-type inkjet printer which performs bi-directional printing. As shown, the printer 20 includes a mechanism in which printing paper P is conveyed by a paper feed motor 74, a mechanism in which a carriage 80 is caused to move in a reciprocating manner by a carriage motor 70 in the axial direction of a platen 75, a mechanism in which a print head 90 mounted in the carriage 80 is driven, ink is ejected, and dot formation is performed, and a control unit 30 for governing the interaction of signals among the paper feed motor 74, the carriage motor 70, the print head 90, and the control panel 99.

The mechanism for causing the carriage 80 to move in a reciprocating manner in the axial direction of the platen 75 includes a sliding shaft 73 installed parallel to the axis of the platen 75 to slidably hold the carriage 80, and a pulley 72 over which an endless drive belt 71 has been stretched along with the carriage motor 70.

Ink cartridges 82-87 containing cyan ink (C), magenta ink (M), yellow ink (Y), black ink (K), light cyan ink (Lc), and light magenta ink (Lm) are mounted in the carriage 80. Nozzle columns corresponding to each one of these color inks is formed in the print head 90 at the bottom of the carriage 80. When these ink cartridges 82-87 are mounted in the carriage 80 from above, ink can be supplied from each cartridge to the print head 90.

Figure 2:
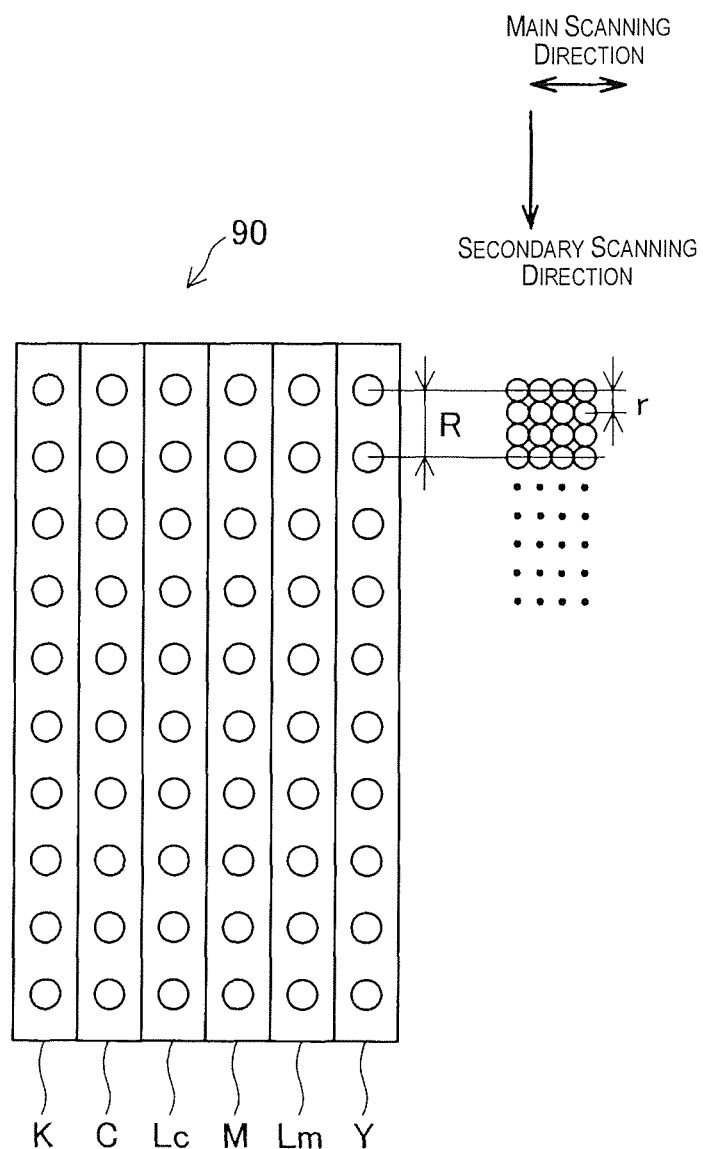
FIG. 2 is a descriptive diagram illustrating the nozzle columns in the print head 90 of this embodiment.

As shown in FIG. 2, nozzle columns are provided in the printing head 90 so that a plurality of nozzles for ejecting ink droplets are arranged in the secondary scanning direction. The arrangement pitch R of the nozzle columns is an integer multiple of the dot formation pitch (raster distance r). The printing is performed using so-called interlacing, in which each raster is completed during the printing process by repeatedly performing main scanning while moving the paper in the secondary scanning direction relative to the print head 90 during each main scan. So-called overlap printing can also be performed in which one raster is completed over multiple main scans. As a result, printing can be performed using so-called alternating column dot placement (FIG. 3A) or alternating raster dot placement (FIG. 3B) in which interlacing and overlapping are combined to integrate dots formed in each raster or each column during either forward action or reverse action of the print head 90. Alternatively, printing can be performed using so-called crossed dot placement (FIG. 3C) in which dots formed during forward action and dots formed during reverse action are arranged alternately in each raster and in each column. In the first embodiment, printing is performed using crossed dot placement as shown in FIG. 3C. Because the methods for realizing the desired dot placement using interlacing and overlapping are well known, a detailed description has been omitted.

The control unit 30 for controlling the print head 90, carriage motor 70, and paper feed motor 74 mentioned above to execute the printing process includes a CPU 40, a ROM 51, a RAM 52, and an EEPROM 60 connected to each other via a bus. The control unit 30 deploys programs stored in the ROM 51 and the EEPROM 60 in the RAM 52 and executes them to control all of the operations of the printer 20. It also functions as the dot data generating unit 42 and the printing unit 43 in the claims. The function units will be described in detail below.

A dither mask 62 is stored in the EEPROM 60. The size of the dither mask 62 used in this embodiment is 64×64, and the threshold values from 0 to 256 are stored in 4096 storage elements. Each threshold value is used in the halftone processing described below. The placement of each threshold value in the dither mask 62 is decided so as to give it characteristics close to those of a so-called blue noise mask. The characteristics of the dither mask 62 used in this embodiment are described in detail below. The configuration is one of a dispersion-type dither mask with high dispersion properties, which is similar to a dither mask used to realize high-quality images.

In this embodiment, the printing is performed by the printer 20 alone. A memory card slot 98 is connected to the control unit 30, and image data ORG is read and inputted from a memory card MC inserted into the memory card slot 98. In this embodiment, the image data ORG inputted from the memory card MC is data with three color components: red (R), green (G), and blue (B). The printer 20 performs printing using images ORG in the memory card MC. In addition, the printer can be connected to an external computer via a USB port and/or LAN, and halftone processing can be performed by the computer. The results can then be received and printed by the printer 20.

In a printer 20 having the hardware configuration described above, the carriage motor 70 is driven to reciprocate the print head 90 relative to the printing paper P in the main scanning direction, and the paper feed motor 74 is driven to move the printing paper P in the secondary scanning direction. The control unit 30 aligns the reciprocating movement of the carriage 80 (main scanning) with the feeding of the print medium (sub-scanning), and drives the nozzles according to the appropriate timing on the basis of printing data to form ink drops of the appropriate color in the appropriate locations on the printing paper P. In this way, the printer 20 can print color images inputted from a memory card MC on printing paper P.

A-2. Printing Process

Figure 4:
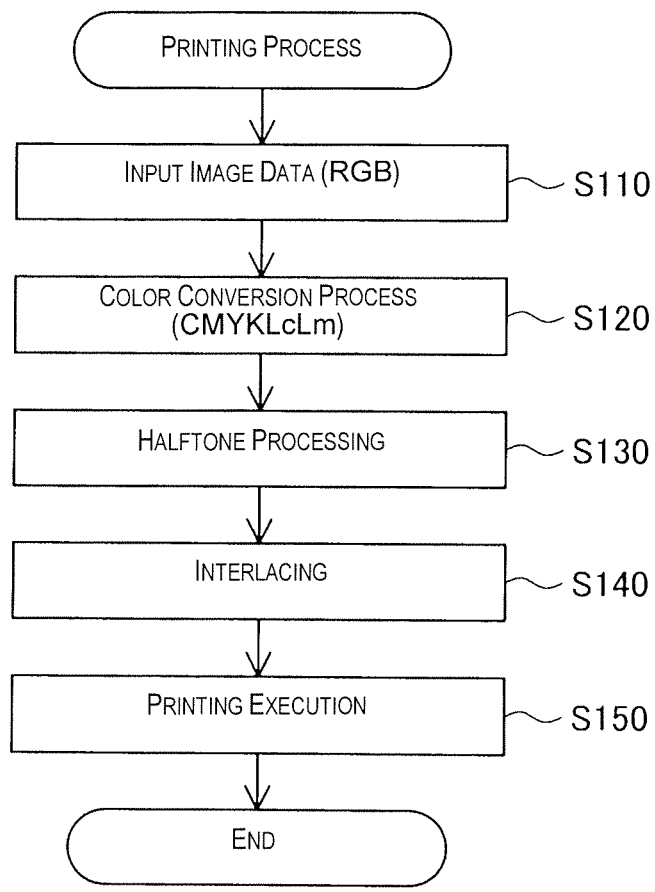
FIG. 4 is a flowchart of the printing process in this embodiment.

The printing process performed by the printer 20 will now be described. FIG. 4 is a flowchart showing the printing process performed by the printer 20. Here, the user operates the control panel 99 to initiate the printing process by performing a printing instruction operation for a predetermined image stored in the memory card MC. When the printing process has been initiated, the CPU 40 first reads and inputs the RGB-formatted image data ORG to be printed from the memory card MC via the memory card slot 98 (Step S110).

When the image data ORG has been inputted, the CPU 40 references the look-up table (not shown) stored in the EEPROM 60, and performs color conversion on the image data ORG from the RGB format to the CMYKLcLm format (Step S120).

When the color conversion has been performed, the CPU 40 performs a process (referred to below as halftone processing) as the dot data generating unit 42 in which the image data is converted into ON/OFF dot data for each color (referred to below as dot data) (Step S130). In this embodiment, this process is performed using the dither method. In other words, the inputted data is compared to the threshold values stored in the storage elements constituting the dither mask 62 at the positions corresponding to the inputted data. When the inputted data is greater than the threshold value, a determination is made to form a dot (dot ON). When the inputted data is equal to or less than the threshold value, a determination is made not to form a dot (dot OFF). The dither mask 62 used in this process is applied repeatedly in the main scanning direction and the secondary scanning direction with respect to the inputted data aligned in the main scanning direction and the secondary scanning direction. The halftone processing in this embodiment is controlled so that the generated dot data has predetermined characteristics. The content of the control is dependent on the nature of the dither mask 62. The characteristics of the dither mask 62 are described below. The halftone processing is not limited to binary ON/OFF dot processing. It can also be multi-value processing such as ON/OFF processing of large dots and small dots. Also, the image data provided in Step S130 can be obtained from image processing such as resolution conversion processing and smoothing processing.

When the halftone processing has been performed, the CPU 40 performs overlapping and interlacing alternatingly aligned with respect to dot data to be printed in a single main scanning unit, harmonized with the nozzle arrangement of the printer 20, the paper feed rate, and other parameters (Step S140). When overlapping and the interlacing are performed, the CPU 40 drives the print head 90, the carriage motor 70, and the motor 74 as a process of the printing unit 43, and executes printing (Step S150).

Figures 5A, 5B:
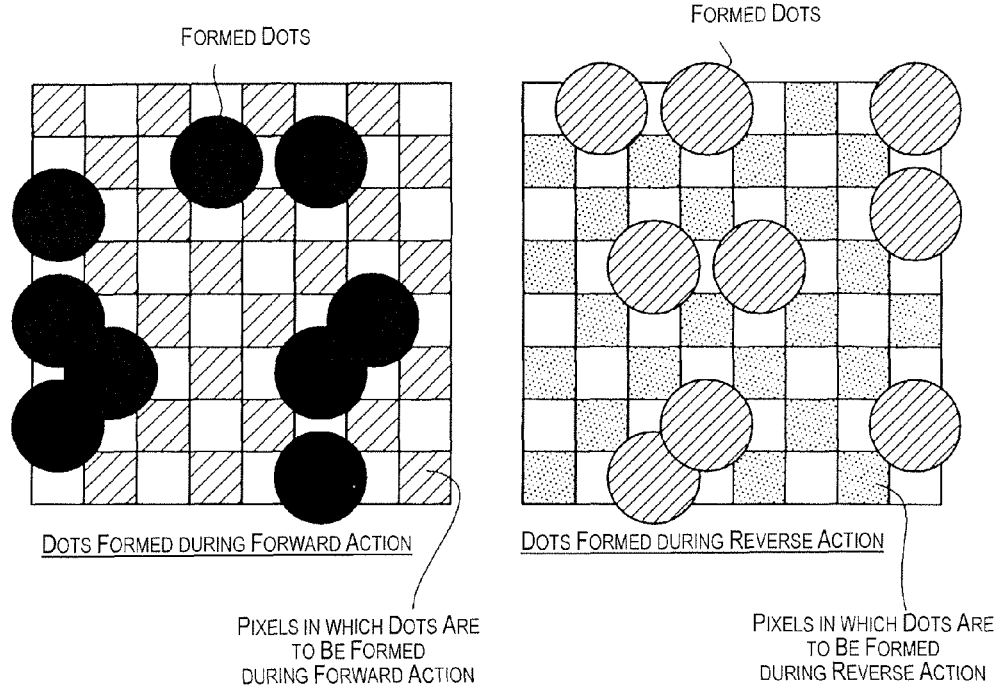
FIG. 5 is a descriptive diagram showing dots formed during forward action, dots formed during reverse action, and a combination of these dots.

The following is a description of the arrangement of dots formed in this printing process. As is clear from the description provided above, the printer 20 forms dots by ejecting ink from the print head at a plurality of different timings (in other words, forward action and reverse action) in the common print region of the print medium while changing the ink ejection position with respect to the print medium, and a printed image is outputted in which the dots formed during the forward action (referred to below as the forward action dots) and the dots formed during the reverse action (referred to below as the reverse action dots) are aligned with each other. Because the dots in the first embodiment have a crossed arrangement (FIG. 3C), the dots formed during forward action by the print head 90 are formed in pixel positions arranged in an alternating manner as indicated by the cross-hatching in FIG. 5A, and the dots formed during the reverse action by the print head 90 are formed in pixel positions arranged in an alternating manner shifted one pixel in the column direction with respect to the dot positions during forward action as indicated by the shading in FIG. 5B. The grouping of pixels corresponding to the dots formed during forward action is called the first pixel group, and the grouping of pixels corresponding to the dots formed during reverse action is called the second pixel group. In FIG. 5A and FIG. 5B, the dots that are actually formed are indicated by black circles and hatched white circles, respectively. The dot size is set to be larger than the diagonal size of the pixels so that the surface of the print medium can be covered 100% at maximum density, even when there is some discrepancy in dot formation positions. In the printed image, the dots formed in the first and second pixel groups are aligned as shown in FIG. 5C.

Figure 5C:
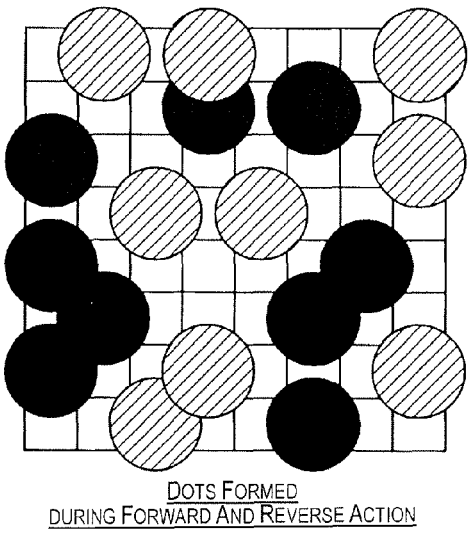
Figure 6A:
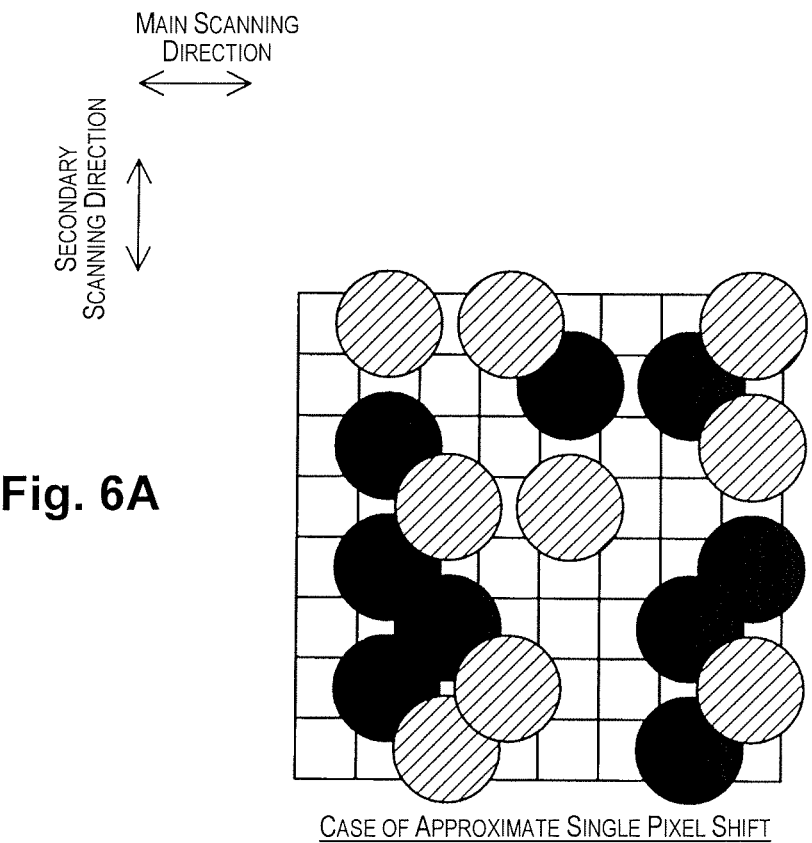
FIG. 6 is a descriptive diagram illustrating cases in which there is a shift in the dot formation position during forward action and during reverse action.
Figure 6B:
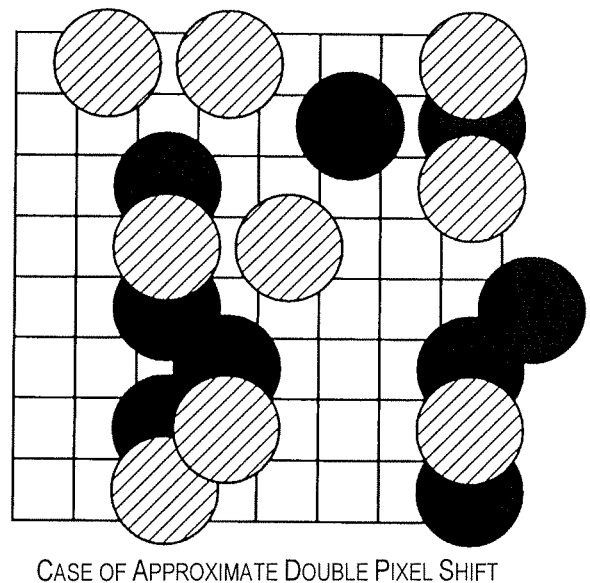

Because the printing conditions for dot formation are different during forward action and reverse action, the dots that are actually formed can differ from those shown in FIG. 5C. For example, when the dot formation position during forward action is shifted approximately one pixel in the raster direction (main scanning direction) with respect to the dot formation position during reverse action, the dots formed during forward action in the example shown in FIG. 5C are shifted in the main scanning direction as shown in FIG. 6A. As a result, the area with overlapping dots is increased. When the shift is increased to two pixels as shown in FIG. 6B, the area with overlapping dots is increased even further. Without any shifts, as shown in FIG. 5C, there is very little overlap between dots. This is because the dots are separated as much as possible and arranged using a dither mask having blue noise characteristics. By contrast, when a shift occurs in the dot formation position during actual printing, the amount of overlap increases between the dots belonging to the first pixel group formed during forward action and the dots belonging to the second pixel group formed during reverse action as shown in FIG. 6A and FIG. 6B. When the amount of dot overlap increases, the coverage, which indicates the percentage of printing paper P covered with dots, changes. Dots that are not adjacent to each other when there is no shift in the dot formation position can be formed in adjacent positions when there is a shift in the dot formation position. In this case, there is no change in coverage, but the sense of graininess is changed because dots are close to each other.

A-3. Halftone Processing

With these points in mind, the characteristics of the halftone processing in the first embodiment will now be described. In the first embodiment, the halftone processing indicated as Step S130 in FIG. 4 decides whether or not a dot is to be formed in a given pixel position by comparing the gradation values for the pixel belonging to the first pixel group and the pixel belonging to the second pixel group to the dither mask 62 stored in the EEPROM 60. Data indicating the decision on whether a dot is to be turned ON or OFF is called dot data.

Figure 7A:
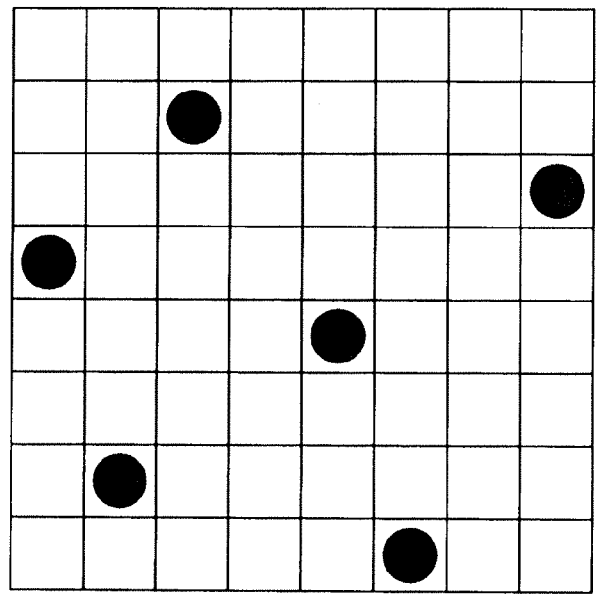
FIG. 7 is a descriptive diagram showing an arrangement example of dots and paired dots in a case in which a dispersion-type dither mask has been used.

As already described, the dither mask 62 used to generate dot data is set to have high dispersion properties. Thus, the placement of dots in a low density region of the image is sparse. From the standpoint of dispersion properties, hardly any dots are placed in two pixels adjacent to each other vertically or horizontally. How this looks is shown in FIG. 7A. The example showing in FIG. 7A has an 8×8 region, and the gradation values for the image are a uniform 26/255. In this case, dots are formed in approximately one-tenth of the pixels in the 8×8 region, or in approximately six pixels.

Figure 7B:
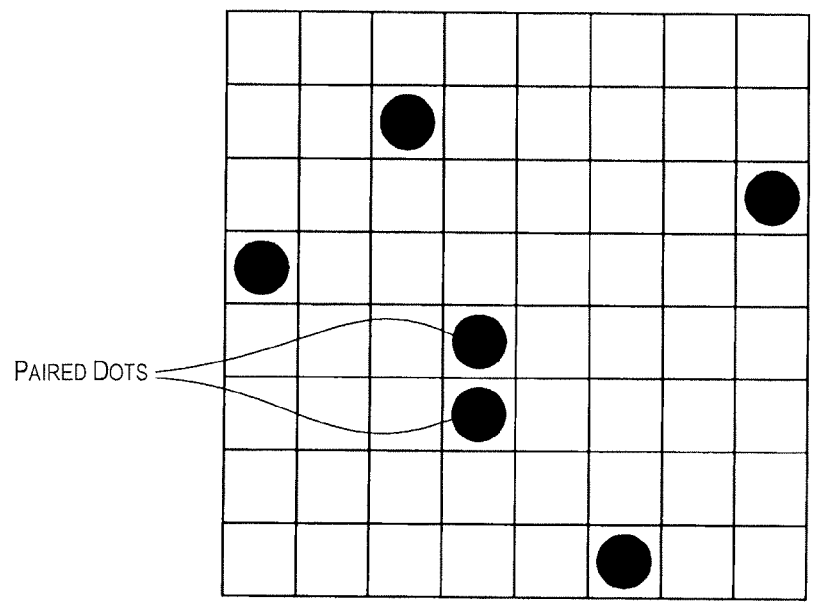

By contrast, in the first embodiment, the threshold values in the dither mask 62 have been set so that there is a significant probability that dots will be placed in adjacent pixels. FIG. 7B shows an example in which dots are formed in adjacent pixels. In the first embodiment, the dither mask 62 is created so that there is a significant probability that dots will be formed in adjacent pixels even in a region in which the gradation values for the pixels are low (for example, a region having gradation values of 1-127/255).

Here, a significant probability is a probability set in the following manner. In the dither mask 62 used in the first embodiment, when there is a probability of dot placement in each pixel belonging to the first and second pixel groups of k (0≤k≤1) in an image data gradation value range of 0-127/255, the probability K of a dot being formed in a pixel adjacent to one in which a pixel has been formed rightward in the raster direction (main scanning direction) or in a pixel adjacent to one in which a pixel has been formed downward in the column direction (secondary scanning direction) is approximately $0.8 \times k^2$.

Among the pixels adjacent to a reference pixel, the ones belonging to a different group in which dots are formed are referred to below as adjacent pixels. In the crossed arrangement shown in FIG. 3C, there are four pixels adjacent to the reference pixel in the vertical and horizontal directions. When a significant discrepancy occurs in the formation position of dots, it is between dots formed during the forward action and dots formed during the reverse action. Therefore, the dot occurrence probability is adjusted not simply with respect to dots being adjacent to each other, but with respect to dots from different pixel groups being adjacent to each other. In the first embodiment, the dots formed during forward action and the dots formed during reverse action are arranged in an alternating manner, as shown in FIG. 3C. Thus, pixels belonging to a different group are adjacent to a reference pixel in four locations: up, down, left, and right relative to the reference pixel. In this embodiment, only the pixel to the right of the reference pixel in the raster direction (main scanning direction) and the pixel underneath the reference pixel in the column direction (secondary scanning direction) are adjacent pixels of the reference pixel. This is because paired dots (dots formed in both adjacent pixels) can be counted using only one of two adjacent pixels symmetrical with respect to the reference pixel. In all of the pixels forming an image, the reference pixel moves successively from the upper left to the lower right of the image. When only one of two adjacent pixels symmetrical with respect to a reference pixel is counted, all of the paired dots can be counted without duplication.

Figure 8A:
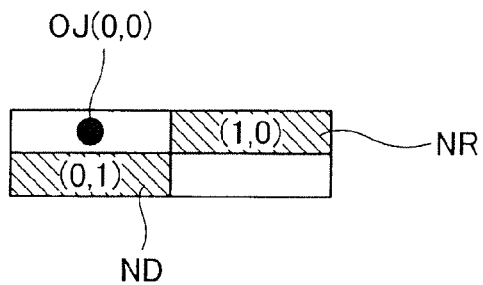
FIG. 8 is a descriptive diagram showing adjacent pixels NR and ND in relation to reference pixel OJ.
Figure 8B:
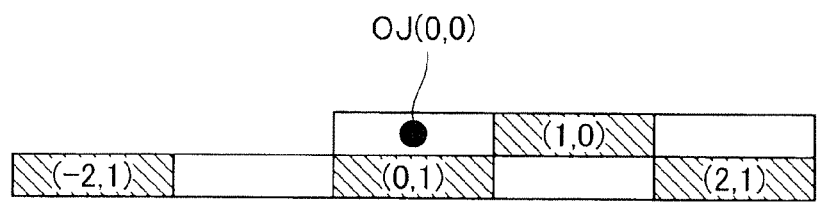
Figure 8C:
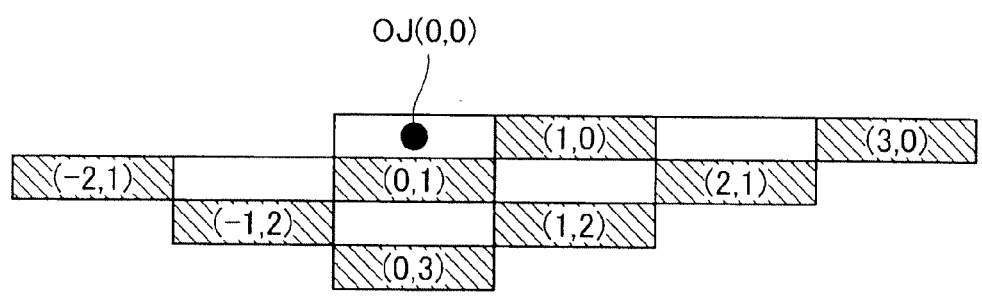

In FIG. 8A, the position of reference pixel OJ is (0,0). When there is positive movement in the main scanning direction and the secondary scanning direction, position (1,0) indicates adjacent pixel NR to the right, and position (0,1) indicates adjacent pixel ND below. In a case in which a relationship between the reference pixel OJ and either adjacent pixel NR or ND is identified, the combination is referred to as paired pixels. In the first embodiment, as mentioned above, an adjacent pixel constituting paired pixels with the reference pixel is limited to the pixels NR, ND to the right or underneath the reference pixel OJ. However, this can be reversed and the counting of paired dots can be limited to pixels to the left of the reference pixel OJ and above. In FIG. 8A, paired pixels are limited to pixels adjacent to the reference pixel. However, pixels whose probability of occurrence is considered to constitute paired pixels do not have to be limited to adjacent pixels. As shown in FIG. 8B and FIG. 8C, pixels in positions set apart from the reference pixel can be considered to constitute adjacent pixels. These cases will be described in greater detail below.

The probability of dots being formed in paired pixels will now be described. Here, gradation values correspond to the probability of a dot being turned ON (formed). When a halftone-processed image ORG is an image with a uniform gradation value of 26/255, approximately one dot is placed for every ten pixels (k=0.1). By contrast, the probability K of dots being formed in paired pixels using the dither mask in the first embodiment is approximately $K=0.8 \times k^2 \approx 0.008$. In a conventional dither mask having high dispersion properties, the dispersion properties of dots in a low density region takes precedence. The probability of dots being formed in adjacent pixels or paired pixels that are adjacent is as close to zero as possible. When a dither mask having the known characteristics of a blue noise mask is used, no examples of dots formed in paired pixels at a gradation value of 26/255 have been found.

By contrast, in the first embodiment, the gradation values are 0-127/255. In other words, the probability K of dots being formed in paired pixels is approximately $0.8 \times k^2$ in a dot formation probability k range of approximately 0-0.5. For example, when the gradation value is 52/255 (k≈0.2), the probability K of dots being formed in paired pixels is 0.032. In other words, dots are formed at an approximate percentage of three groups per 100 groups of paired pixels.

Figure 9:
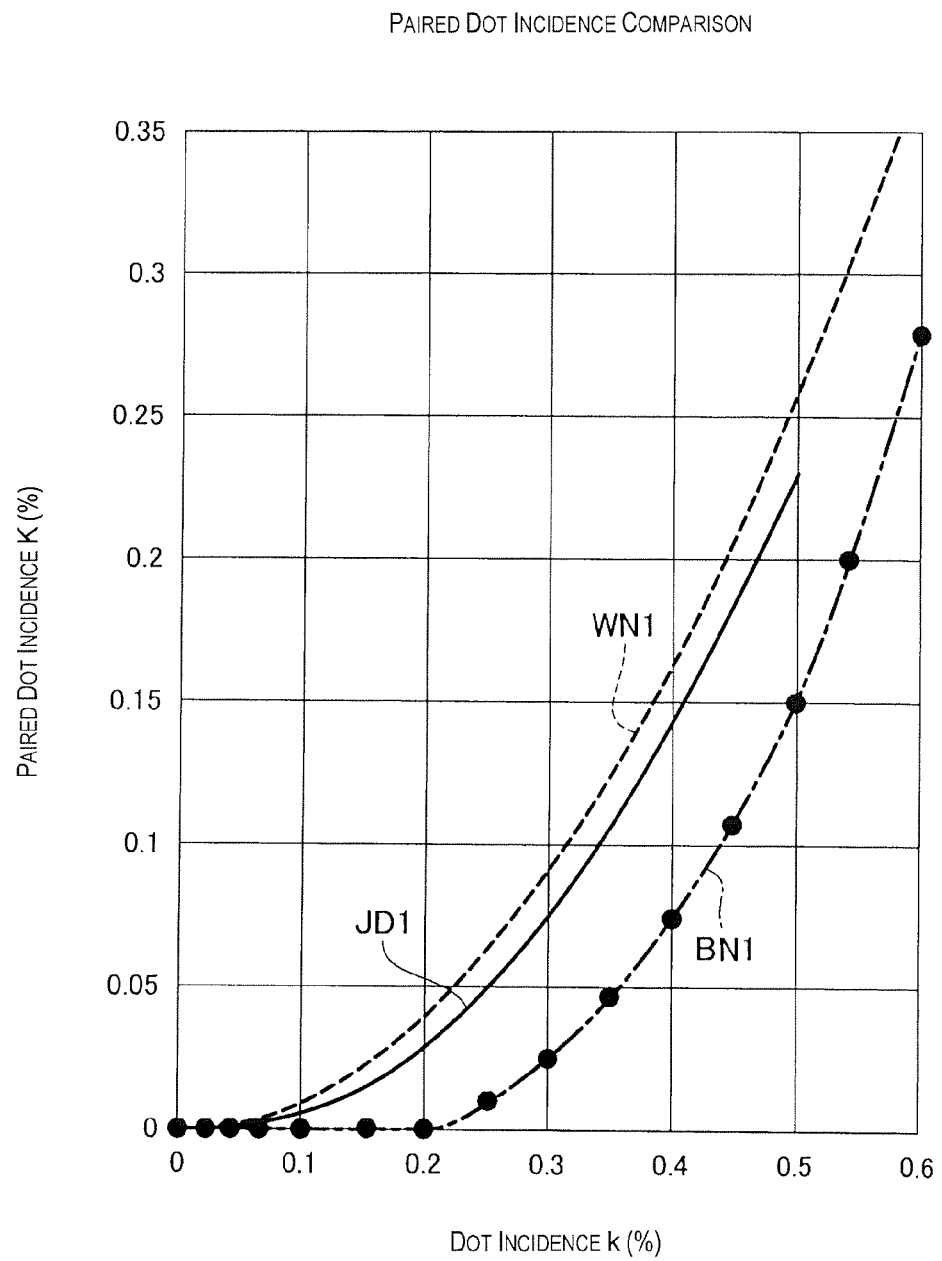
FIG. 9 is a graph showing the relationship between the dot incidence k and the paired dot incidence K.

The percentage of dots formed in paired pixels is illustrated schematically in FIG. 9. In FIG. 9, the horizontal axis indicates the probability of a dot being formed in a pixel, which corresponds to the gradation value of the image. In FIG. 9, the vertical axis indicates the percentage of dots formed in paired pixels. In FIG. 9, solid line JD1 indicates a case in which halftone processing was performed using the dither mask of this embodiment, and dotted line BN1 indicates a case in which halftone processing was performed using a blue noise mask. Dashed line WN1 indicates a case in which halftone processing was performed using a white noise mask. Here, the white noise mask is a dither mask in which each threshold value was set using random numbers in a sufficiently large mask size to obtain results similar to the random dithering method in which the threshold value is generated each time using a random number. In contrast to a blue noise mask which has blue noise characteristics that do not contain any low-frequency components, a white noise mask has white noise characteristics that evenly contain everything from low-frequency components to high-frequency components.

When a blue noise mask is used, as shown, the probability of dots being formed in paired pixels is close to zero in a region having a low image gradation value (gradation value 0 to 51, dot occurrence probability k=0 to 0.2). By contrast, when a white noise mask is used, the formation position for dots is random. The probability of dots being formed in paired pixels closely matches $k^2$, where the probability of dot formation is k. While the dither mask employed in the present embodiment is a dispersion-type dither mask in contrast to these characteristics, the probability K of dots being formed in paired pixels is approximately $0.8 \times k^2$ in a gradation value range of 0 to 127 (dot occurrence probability k=0 to 0.5) as indicated by solid line JD1. In other words, the dither mask used in this embodiment has dispersion properties close to those of a blue noise mask in the distribution of formed dots, but the probability K of dots being formed in paired pixels is close to that of a white noise mask. How a dispersion-type dither mask is created with an increased percentage of dot formation in paired pixels will be described below in further detail.

A-4. Effect of the Embodiment

In a printer 20 of the first embodiment with the configuration described above, image data ORG is received, processing is performed as shown in FIG. 4 by the control unit 30, and an image is printed on printing paper P. At this time, halftone processing is performed on the gradation value of each pixel constituting the image using the dithering method with a dither mask 62 to convert them to the distribution of dots. Dispersion properties take precedence in the dither mask 62, which is a dispersion-type dither mask with characteristics typical of a blue noise mask. As a result, the image quality of an image produced by this halftone processing and expressed by the dot distribution has a low sense of graininess and high reproducibility of the image.

In addition, the probability of dots being formed in paired pixels, that is, a pixel in the first pixel group to which dots formed during the forward action of the print head 90 belong, and a pixel in the second pixel group to which dots formed during the reverse action belong which have an adjacent relationship, is set so as to be higher than that of a blue noise mask. Therefore, it has characteristics by which image quality is less likely to deteriorate even when there is a shift in the formation position of dots during forward actions and reverse actions. This point will be described with reference to FIG. 10.

Figure 10:
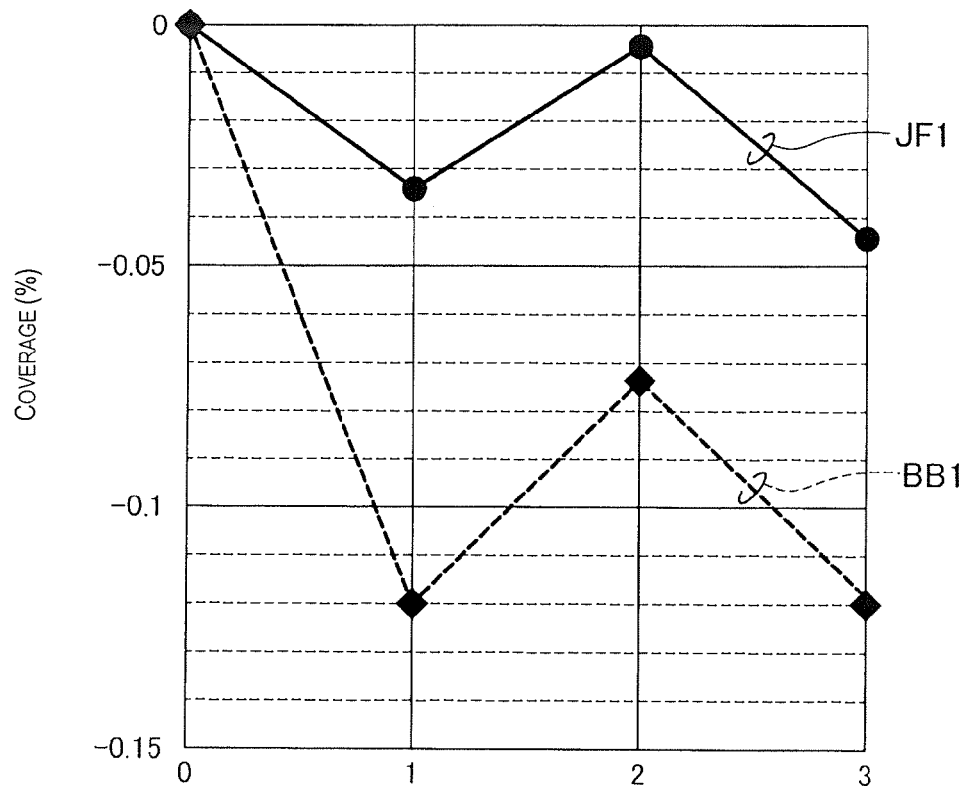
FIG. 10 is a graph showing an example of a change in coverage in a case in which there is a shift in dot formation positions during forward action and during reverse action.

FIG. 10 is a graph showing simulation results for a change in coverage in a case in which image data ORG was processed with gradation values in which the percentage of dot formation was 96/255. In this figure, the horizontal axis indicates the shift in the formation position of dots during forward action and reverse action. Here, the units are pixels. The vertical axis indicates the change in coverage. In the graph shown in FIG. 10, the solid line JE1 indicates a case in which the dither mask 62 in the first embodiment is used, and dashed line BB1 indicates a case in which a typical blue noise mask is used. This mask was created so that dots are generated as discretely as possible. Here, coverage means the percentage of paper P covered by formed dots, and the change in coverage means the change in the percentage of paper P covered by overlapping dots caused by a shift in the formation position of dots relative to the percentage of paper covered by dots in the original case in which there is no shift in the formation position of dots.

In FIG. 10, the dot size is set to be somewhat larger than the pixel size in order to approximate actual printing conditions with the printer. As a result, even when dots overlap, dot overlapping occurs in which adjacent dots contact each other, and coverage is reduced. In a typical blue noise mask, the dispersion placement is such that the distance between dots is as far apart as possible. As a result, contact between pixels, the cause of coverage reduction, is minimized when there is no shift. Therefore, when a shift occurs in the formation position of dots during reciprocal printing with an actual printer 20, the formation position of dots slips from the optimal placement, contact between dots and overlapping increase, and coverage is generally reduced. In a case where data of the same gradation value is printed, a change in coverage will result in variation in the concentration of the image as well as a drop in the image quality. Unevenness in image quality due to changes in coverage is more conspicuous in larger printed items printed by large printers. This is because larger printed items are generally viewed from a greater distance. When viewed from a greater distance, uneven printing at lower frequencies is more noticeable.

When the dither mask 62 in this embodiment is used, as shown in FIG. 10, it is evident that there is less change in coverage compared to a case in which an ordinary dispersion-type dither mask is used, even when there is a shift in the formation position of dots during forward action and reverse action. FIG. 10 shows the change observed when the amount of shift Δd in the printing position during reverse action relative to the printing position during forward action is greater when Δd is an odd number (i.e., 1, 3 . . . ) than when Δd is an even number (i.e., 2, 4 . . . ), where Δd is expressed in pixel units, and a period is a shift of 2. The reason for the change in a period of a shift of 2 is that the position of dots formed during forward action and the position of dots formed during reverse action completely overlap when the horizontal shift is an odd number during printing using crossed arrangement as shown in FIG. 3C. In a simulation in which a shift in the formation position of dots due to other factors was not taken into account, and printing was performed under the assumption that the shift in the formation position of all dots was the same during forward and reverse action, the reduction in coverage became apparent when the horizontal shift was an odd number, as shown in FIG. 10. In an actual printer 20, a small position shift in pixel units is superimposed on the shift in the formation position of dots during reciprocating printing. As a result, the change in coverage shown in FIG. 10 is made flatter. In a case in which the dither mask 62 in this embodiment is used [as indicated by] the solid line JF1 in FIG. 10, the change in coverage is flatter still, and hardly poses a problem. By contrast, the change in a case in which a dispersion-type dither mask is used [as indicated by] the dashed line BB1 in FIG. 10 is flatter to some degree but not sufficiently eliminated, so that a change in coverage remains.

Therefore, a printer 20 using the dither mask of this embodiment can suppress a decline in printing quality caused by a shift in the formation position of dots during reciprocating action better than a conventional dispersion-type dither mask, and can realize better print quality. Even in a case in which a shift in the formation position of dots occurs when an image with low gradation values is printed, the number of paired dots formed does not change very much. This is because the percentage of paired dots formed in the low gradation value region originally is close to the percentage $k^2$ occurring in a case in which random dot placement is employed. As described using FIG. 9, when the probability K of dots being formed in paired pixels in the low gradation value region is small or close to zero as in a blue noise mask, and a large shift occurs in the formation position of dots in the forward action and reverse action, or in the formation position of dots after sub-scanning, dots that were not intended to be paired originally become adjacent to each other or overlap, the change in coverage is large, and uneven density occurs in the image. The sense of graininess in the low density region also deteriorates. In halftone processing using the dither mask of this embodiment, the probability of dots being formed in paired pixels is increased from the start, so the probability of dots being formed in paired dots does not change very much even when there is a shift in the formation position of dots. As a result, this does not lead to deterioration in the sense of graininess in the image.

Figure 11:
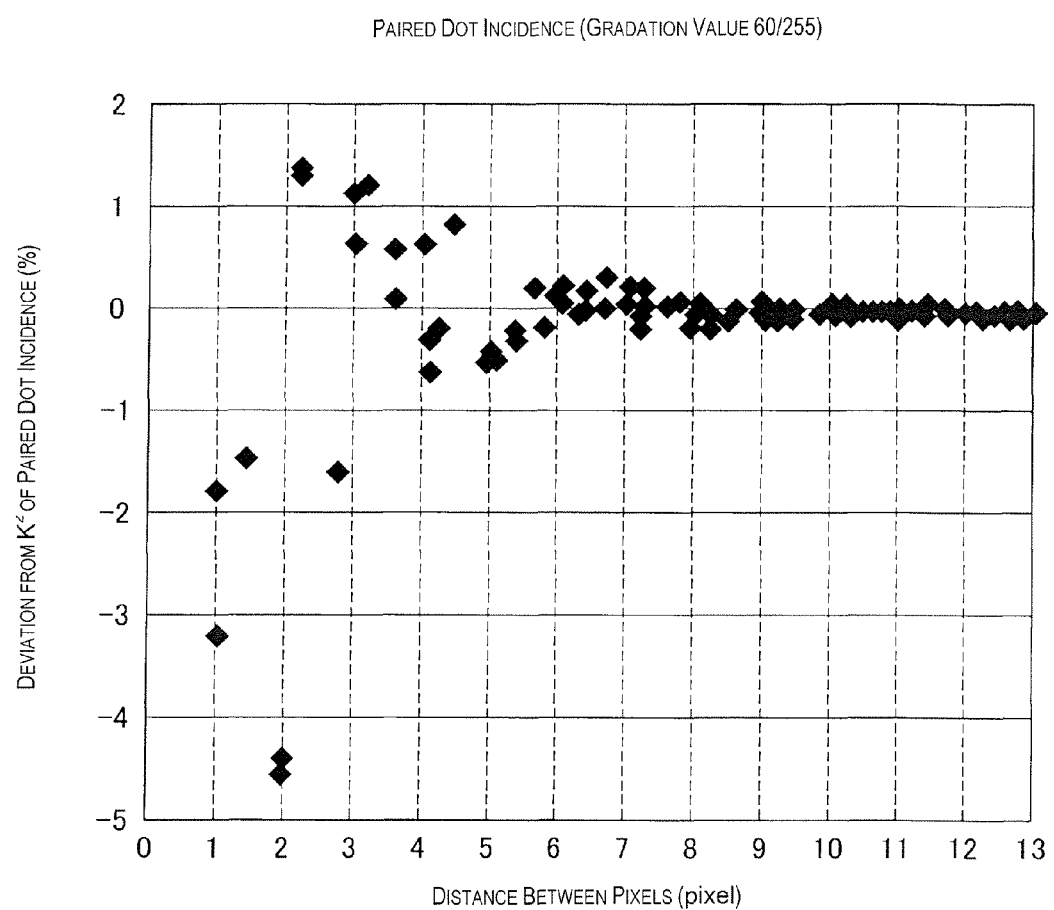
FIG. 11 is a graph showing the relationship between the amount of shift in dot formation positions in pixel units and the deviation from $k^2$ of the paired dot incidence.

Setting the percentage of paired dot formation close to $k^2$ is based on the following new finding. When there is a shift in the formation position of dots in a certain pixel group and the shift is sufficiently large, it has been found that the probability of dots becoming adjacent to each other in a certain direction and becoming paired dots converges on $k^2$, even when the interval between dots is increased as much as possible through dispersed placement using a blue noise mask. Actual blue noise masks were studied and it was found, as shown in FIG. 11, that the probability of paired dots occurring converged on the constant value $k^2$ when the shift was from four to five or more pixels. This is because two pixels originally placed apart from one another became adjacent when the shift was large. Because the correlation for the presence or absence of dot formation for both pixels is reduced when the distance between two pixels is sufficient, the probability of dots being formed simultaneously in both pixels is $k^2$, which is obtained by simply multiplying the gradation values (dot formation probability k) of the two. Therefore, if the paired dot incidence in a situation with no shift is brought close to $k^2$ in advance, the paired dot incidence will not change very much no matter how much of a shift occurs, and any change in coverage can be suppressed.

In the first embodiment, the probability K of dots being formed in paired pixels is $K=0.8 \times k^2$. Therefore, a reduction in the dispersion properties of the dot distribution in a case in which there is no shift in the formation position of dots can be suppressed. This coefficient adjusts the probability of paired dots occurring. When the coefficient is 0.8, it means the incidence of paired dots has been suppressed to 80%. The coefficient can be set anywhere within a range, for example, from 0.6 to 1.4. When the coefficient is set in a range from 0.8 to 1.2, a change in the probability of paired dots occurring relative to a shift in the formation position of the dots can be favorably suppressed. A coefficient closer to 1.0 is desirable from the standpoint of suppressing any change in the probability of paired dots occurring. When the dispersion properties of the dots in a low gradation region takes precedence, the coefficient can be adjusted to 0.8 or less, for example, from 0.6 to 0.8.

A-5. Dither Mask Generating Method

Figure 12:
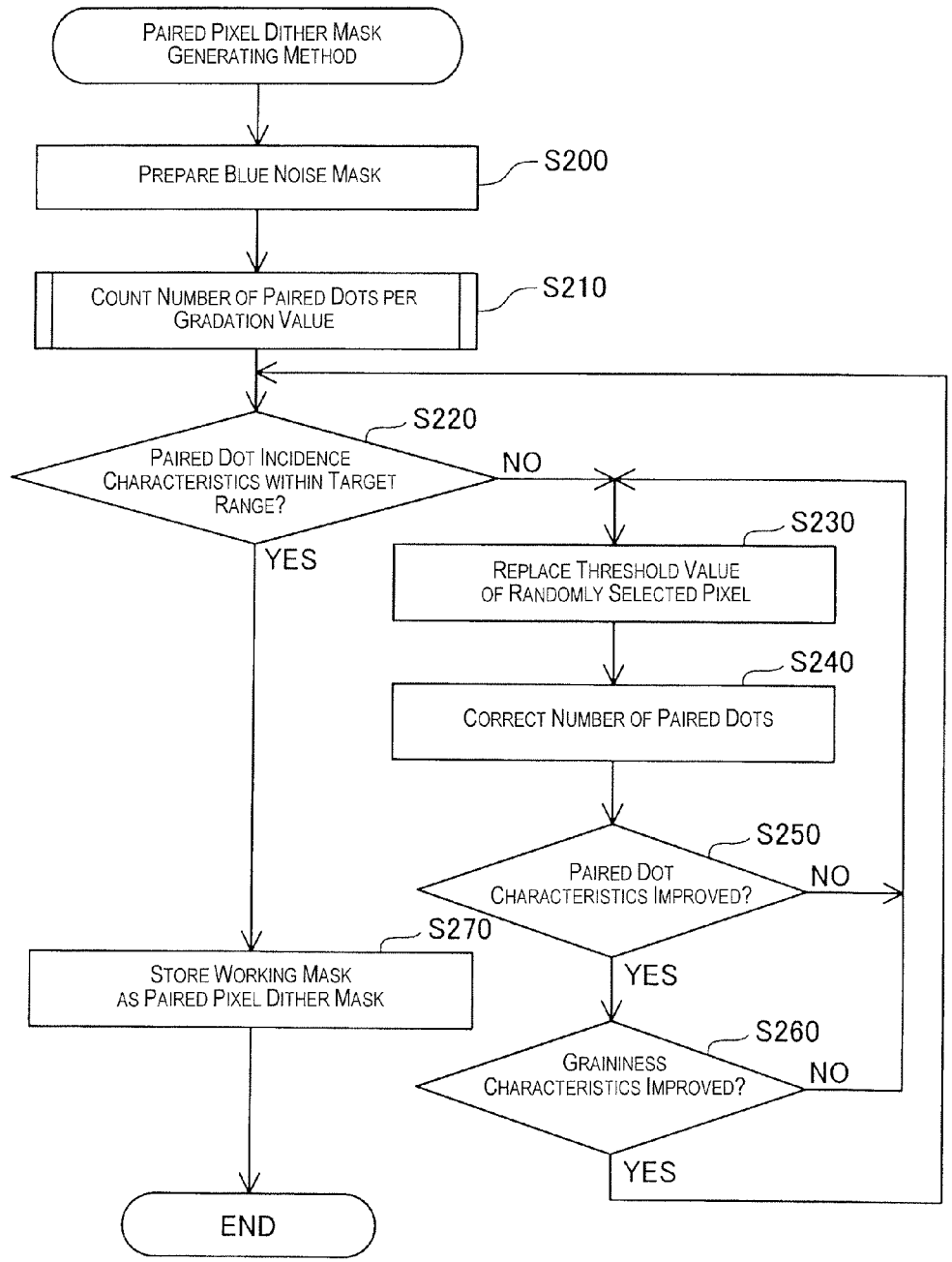
FIG. 12 is a flowchart showing the generating method for a paired pixel control mask.

The dither mask used in the first embodiment is generated using the following method. FIG. 12 is a flowchart showing an example of the generating method for the dither mask used in the first embodiment. In this embodiment, a blue noise mask is prepared, and a dither mask is generated from this blue noise mask in which the probability of dots being formed in paired pixels approaches $K^2$. The generated dither mask is called a "paired pixel control mask" below. While the mask is being generated, it is referred to as a "working mask".

When a paired pixel control mask is generated, a blue noise mask is first prepared (Step S200). In this example, a 64×64 blue noise mask is used. The blue noise mask in this example has 255 threshold values from 0 to 254 stored in a 64×64 matrix. Next, a process is performed on the working mask in which the number of paired dots per gradation value is counted in the entire gradation range (Step S210). More specifically, adjacent right paired dots RPD [1, 2, ... 127] and adjacent underneath paired dots UPD [1, 2, ... 127] are counted individually. In the following description, the use of parentheses such as (S) indicates the value for a gradation value S, and the use of brackets such as [a, ... x] indicates the sequence a-x in a gradation range. The sequence a-x in a gradation range is also expressed as [a:x].

Because all of the threshold values in the working mask are known, the formation position of dots for each gradation value can be examined in the gradation value 1-127/255 range. As a result, the number of adjacent right paired dots RPD (S) and adjacent underneath paired dots UPD (S) can be easily counted for each gradation value S. Here, the number of paired dots counted is limited to gradation values 1-127/255 because the paired pixel control mask used in the first embodiment, that is, a mask having predetermined characteristics for the probability of paired dots occurring in the 1-127/255 gradation range, is generated. When the gradation values S are larger, the number of paired dots approaches the attempted probability even in a blue noise mask. Therefore, instead of counting the number of adjacent paired dots in the entire range, the probability of paired dots occurring can be adjusted in the gradation value 1-127/255 range as already described with reference to FIG. 9. However, the method described below can also be applied to a case in which the number of paired dots is counted in the entire gradation range to adjust the probability of occurrence.

After counting the number of adjacent right paired dots RPD[1:127] and the number of adjacent underneath paired dots UPD [1:127] in a predetermined gradation range (1-127/255 here) in Step S210, it is determined whether or not the number of paired dots for each gradation value S is within the target range M(S) (Step S220). Here, the target range M(S) is set in the following way. If the dither mask has white noise properties, dots are generated randomly, and the probability of a dot being formed in a pixel is k. In this case, the probability of a dot being formed in an adjacent right pixel or adjacent underneath pixel (the probability of paired dots occurring) is $k^2$ in both cases. When the gradation value of the image is 1, k=0.00392156 (=1/255), and the probability of paired dots being generated is $k^2$=0.0000154. Therefore, in a case in which it is assumed that dots are formed randomly, the value H predicting the presence of paired dots among 64×64 pixels (referred to as the prediction value below) is $H=k^2 \times 4096=0.126 \approx 0$. This calculation is repeated in advance in the 1-127/255 gradation value range to determine the theoretical prediction values for paired dots H[1:127], and this is multiplied by coefficient 0.8 to obtain the paired dot target values m[1:127] for each gradation value S. In this embodiment, the target value m(S) is given a ±20% range, and this is called the target range M(S).

FIG. 13 shows the paired dot prediction values H[1:32] and the target values m[1:32] for a case in which the gradation values S are 1-32. As shown in this figure, gradation value S=10 has prediction value H(10)=6 and target value m(10)=5, and gradation value S=20 has prediction value H(20)=25 and target value m(20)=20.

In Step 220, the theoretical paired dot target range M[1:127] determined in this manner is compared to the number of adjacent right paired dots RPD[1:127] and the number of adjacent underneath paired dots UPD[1:127]. In a case in which it is determined as a result of the comparison that the number of paired dots RPD[1:127] and URD[1:127] is not within the target range M[1:127], a process is performed in which the appropriate number of threshold values (for example, two threshold values) are randomly replaced among the threshold values in the working mask (Step S230). Since the threshold values are randomly replaced, then as long as threshold values corresponding to the same pixel group are replaced, replacing between different pixel groups can also take place.

Because threshold values in the working mask are replaced, the number of paired dots in each threshold value changes. Therefore, the number of paired dots is modified due to the replacement of threshold values (Step S240). Because the number of paired dots only changes within the gradation value range corresponding to the replaced threshold values, a recount is not performed in gradation range 1-127/255. Instead, the adjacent right paired dots RPD[p:q] and the adjacent underneath paired dots UPD[p:q] are recounted when, for example, threshold value p and threshold value q (p<q) have been replaced. While the replaced threshold values are selected randomly, the paired dot generating characteristics have to be adjusted in gradation value range 1-127/255. Therefore, at least one of the replaced threshold values should preferably be a threshold value within this range.

The number of paired dots recounted in this manner is examined, and it is determined whether or not the paired dot characteristics have been improved (Step S250). Here, whether or not the paired dot characteristics have been improved is determined in the following manner.

(A) An improvement is determined when, as a result of threshold value replacement, the number of adjacent right and underneath paired dots RPD[p:q], UPD[p:q] is closer to $k^2$.

(B) An improvement is determined when, as a result of threshold value replacement, either the number of adjacent right or underneath paired dots RPD[p:q], UPD[p:q] is closer to $k^2$ and the other number has remained unchanged.

(C) An improvement is determined when, in a case in which there is some improvement and some deterioration in gradation range [p:q], the sum of the difference between the number of paired dots generated by each gradation value in the gradation range and the prediction value for each gradation value is smaller.

In a case in which this determination is performed and it is determined that there has been no improvement in the paired dot characteristics, the process returns to Step S230, and the process is executed again beginning with the random replacement of threshold values. When two threshold values are replaced in the threshold value replacement process, the number of combinations within the entire gradation range is $_{4096}C_2$. The number is $_{2048}C_2$ when the range is limited to the gradation range 1-127/255. Therefore, while there is a considerable number of possible threshold value replacement combinations and a considerable amount of time is required to exhaust all possibilities, a replacement combination which improves the paired dot characteristics will be found when this process is performed successively (YES in Step S250).

Figure 14:
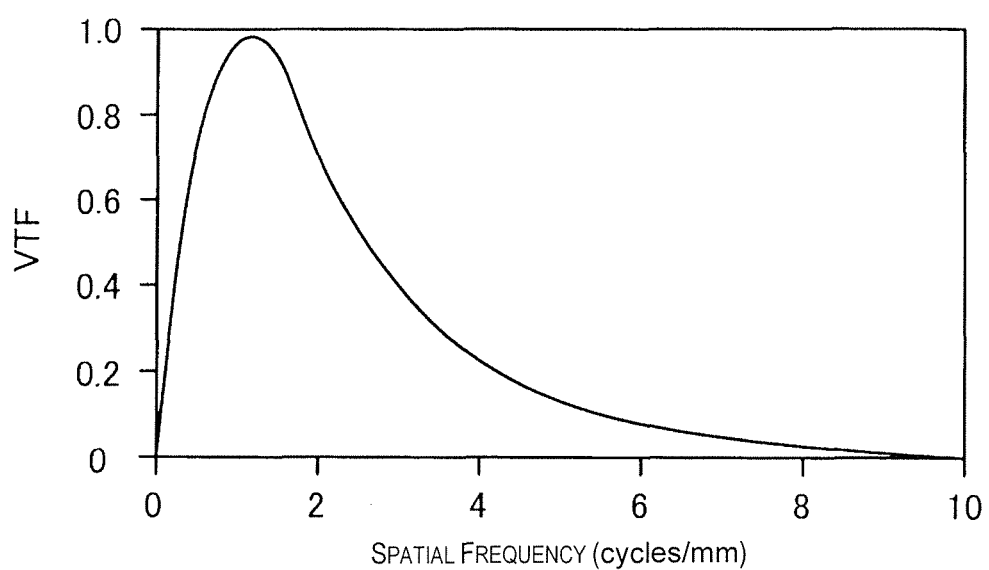
FIG. 14 is a descriptive diagram showing an example of Visual Transfer Function (VTF) sensitivity characteristics.

When it has been determined that the paired dot characteristics have been improved, it is then determined whether or not there is any problem with graininess (Step S260). Here, no problems with graininess means the graininess index shown below is within the target range, or the index is not within the target range but there has been an improvement since threshold value replacement. Because the graininess index is well known in the art (see, for example, Japanese Laid-open Patent Publication No. 2007-15359), a detailed description has been omitted. However, this is an index obtained by performing a Fourier transform on an image to determine the power spectrum FS, weighting the resulting power spectrum FS corresponding to the visual transfer function (VTF) or sensitivity characteristics relative to the spatial frequencies visible to humans, and integrating this at each spatial frequency. A VTF example is shown in FIG. 14. Various equations have been proposed as experimental equations for providing this VTF. A typical experimental equation is shown in Equation (1). Variable L is the observation distance, and variable u is the spatial frequency. The graininess index can be calculated using the calculation equation shown in Equation (2) on the basis of the VTF. Coefficient τ is a coefficient for combining the resulting value with human vision. From the calculation method, it is clear that the graininess index can be said to indicate whether or not dots seem to stand out to humans. A lower graininess index is superior from the standpoint of print quality because it means the dots are less visible.

[Equation 1]

$$VTF(u) = 5.05 \, \exp\left[\frac{-0.138 \, \pi \, L \, u}{180}\right]\left\{1 - \exp\left[\frac{-0.1 \, \pi \, L \, u}{180}\right]\right\} \quad (1)$$

[Equation 2]

$$\text{Graininess Index} = K \int FS(u) \cdot VTF(u) du \quad (2)$$

The blue noise mask prepared initially is configured so that the graininess index has the lowest value. However, when threshold values are randomly replaced in Step S230, the graininess of the working mask is worse than the blue noise mask. Therefore, a target range is provided for the graininess index, which is the acceptable range based on characteristics of human vision. This range is used to determine whether or not there are any problems. Because the graininess index is a value determined for each gradation value, an upper limit is prepared for each gradation value. When the graininess index for each gradation value is below the upper limit, the graininess can be determined to be within the target range.

In a case in which there is a problem with graininess, that is, the graininess is not within the target range, and it has been determined that there has been no improvement compared to the situation before the threshold values were replaced (NO in Step S260), the process returns to Step S230 and is repeated beginning with the replacement of threshold values. When, as a result of repeating the process from Step S230 to Step S260, it has been determined that the paired dot characteristics are improved and that there is no problem with graininess (YES in both Step S250 and Step S260), the loop from Step S230 to Step S260 is exited, the process returns to Step S220, and it is determined whether or not the paired dot generation characteristics are within the target range.

When it cannot be determined whether the paired dot generation characteristics are within the target range (NO in Step S220), the process is repeated beginning with Step S230. In the process shown in FIG. 12, Step S220 through Step S260 are repeated by replacing the threshold values until the conditions have been satisfied. When the number of times the process from Step S230 to Step S260 being performed (referred to below as the number of loops) is small, another acceptable process involves increasing the upper limit for the graininess in Step 260, and bringing the upper limit close to the final target value as the number of loops increases. By changing the upper limit depending on the number of loops performed, the graininess index can be prevented from dropping to the local minimum value.

When the loop from Step S230 to Step S260 has been performed several times, and it has finally been determined that there are no problems with graininess and that the adjacent right paired dots RPD[1:127] and the adjacent underneath paired dots UPD[1:127] are within the target range M[1:127] (YES in Step S220), the paired pixel control mask has been completed. At this time, the working mask is saved as the paired dot control mask (Step S270), the process is exited at END, and the paired dot control mask generating routine (FIG. 12) is ended. In this description, it was determined whether or not the paired dot generating characteristics are within the target range using the 1-127/255 range within the entire gradation value range in which paired dots can be generated. However, any gradation range can be used by the paired dot control mask to control the probability of paired dots occurring. For example, the range can be limited to the low density range (the gradation range corresponding to a dot generation probability of k=0 to 0.25, 0.2 to 0.5).

A paired pixel control mask can be obtained on the basis of a blue noise mask using the method described above. In the first embodiment, the dither mask is a dither mask used to determine dot formation. Because the paired pixel control mask is based on a blue noise mask, it hardly possesses any components in the low-frequency range to which humans have high visual sensitivity when the distribution of dots formed in the image in the low gradation value range is analyzed in terms of spatial frequencies. As a result, a dither mask can be provided which is able to realize high picture quality. In addition, using this paired pixel control mask, the probability of paired dots occurring in adjacent pixels is approximately $k^2 \times 0.8$, where k is the probability of a dot being formed at each gradation value. As a result, a dither mask can be provided in which the change in coverage is small even when there is a shift in the formation position of dots during forward action and reverse action, and in which uneven density in the image caused by a shift in the formation position of dots can be suppressed.

In this embodiment, the paired pixel control mask was generated beginning with a blue noise mask. However, it can also be generated from a dither mask having other characteristics. As mentioned above, the time required to generate a mask can be reduced if the dispersion properties are superior and the original dispersion properties are close to the characteristics to be converged upon, such as in a blue noise mask or a green noise mask. When a dither mask is generated from one of these, a paired pixel control mask can be generated by applying the following rules.

(1) The threshold values are placed in a matrix in successive order from either the small side or the large side.

(2) When the next threshold value is placed relative to a threshold value already placed in a certain position, the placement position for the next threshold value is associated with the evaluation value for the situation using an evaluation value such as the graininess index. In addition, the candidate placement position for the next threshold value is identified in successive order from the highest to the lowest evaluation.

(3) The candidates are taken out in successive order from the highest to the lowest evaluation, and the number of paired dots in this situation is counted. When a candidate is found for the required number of paired dots (for example, the number shown in FIG. 12), the next threshold value is placed in this location.

(4) Rules (1) through (3) are repeated until the threshold values are exhausted. The placement of threshold values can be decided from one, and a paired pixel control mask generated using these rules.

A-6. Modification Examples of First Embodiment

Modification examples of the first embodiment described above will now be described. In the first embodiment, the formation position of the dots alternated between the main scanning direction and the secondary scanning direction during forward action and reverse action, and the positions of the adjacent pixels constituting paired pixels, as shown in FIG. 8A, were two pixels, one to the right in the main scanning direction and another underneath in the secondary scanning direction. However, adjacent pixels are not limited to these two. These adjacent pixels can be to the right and to the left in the raster underneath in the secondary scanning direction. When the position of the reference pixel OJ is (0,0), a total of four groups of paired dots are counted in which the adjacent pixels are the pixels at the (1,0) and (0,1) positions, and the adjacent pixels are the pixels at the (−2,1) and (2,1) positions. This is shown in FIG. 8B. The range can be expanded further and enlarged to eight pixels as shown in FIG. 8C. If the paired pixel range is expanded, the occurrence of density unevenness can be suppressed even when there is a shift in the formation position of dots. It is desirable to expand the range of adjacent pixels in a direction in which a shift in the formation position of dots does not occur during printing. As shown in FIG. 8B, setting the adjacent pixels broadly in the main scanning direction is effective at suppressing density [unevenness] caused by a shift in the main scanning direction.

Figure 3A:
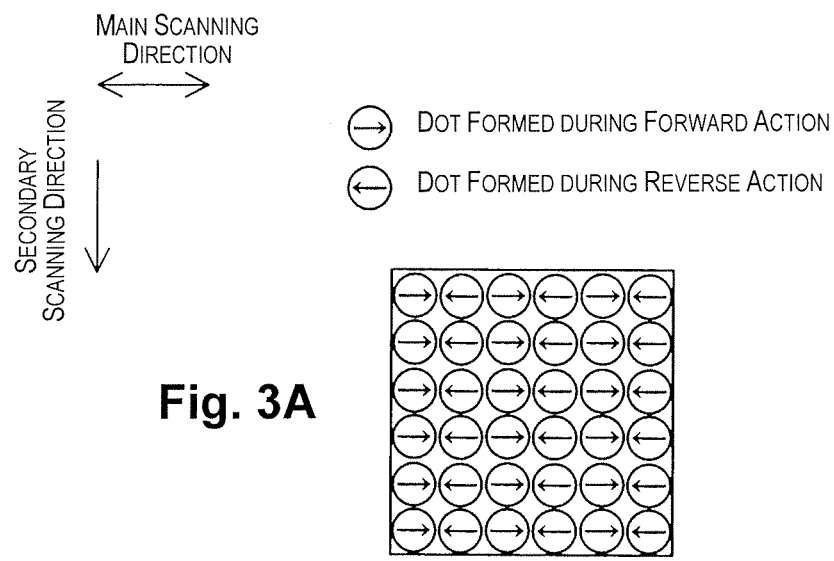
FIG. 3 is a descriptive diagram showing a variation in which the dots formed during forward action and the dots formed during reverse action are combined.
Figure 3B:
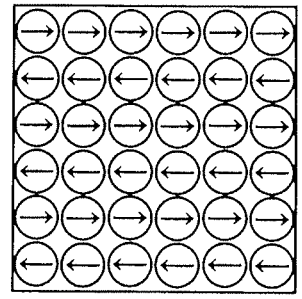
Figure 3C:
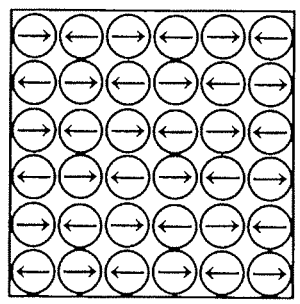
Figures 15A, 15B, 15C:
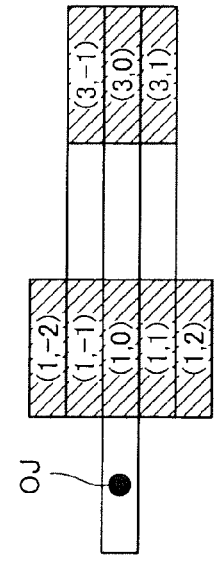
FIG. 15 is a descriptive diagram showing the relationship between the reference pixel and adjacent pixels in another printing method.
Figures 15D, 15E, 15F:
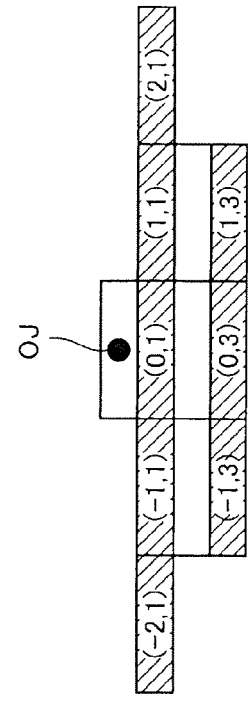

Dots formed during forward action [and] dots formed during reverse action can alternate by column as shown in FIG. 3A and/or alternate by raster as shown in FIG. 3B. Even in this case, the adjacent pixel range can be set in many different ways. In the case of alternating columns, as shown in FIG. 15A through FIG. 15C, one, three or eight pixels can be set as adjacent pixels relative to the reference pixel OJ. In the case of alternating rasters, as shown in FIG. 15D through FIG. 15F, one, four or eight pixels can be set as adjacent pixels relative to the reference pixel OJ. In both of these cases, a paired pixel control mask can be generated on the basis of a blue noise mask using the method shown in FIG. 12 in which the probability K of paired dots occurring is $K=0.8 \times k^2$.

In order to simplify the description of the embodiment and modification examples, the resolution of the gradation values in the image was set at eight bits, and the range of the threshold values was set at 0-255. If the threshold values placed in the dither mask are set at 0-4095, and the number of bits expressing the gradation values in the image is increased, for example, to ten bits, the number of dots placed with respect to the smallest gradation value 1 can be reduced, and the number of dots increased with each increase of 1 in the gradation value can be reduced. As a result, control of the probability of paired dots occurring can be performed more precisely. When the size of the dither mask is increased to 128×128 or 256× 512, the number of dots formed in a case in which the gradation value expressed using ten bits is 1 becomes four in the case of the former and 32 in the case of the later. The size of the dither mask, the number of bits expressing the gradation values, and the type of threshold value placed in the dither mask can be decided by taking into account the purpose of the halftone processing to be executed (image quality takes precedence, processing speed takes precedence, large format printing is to be performed, and the like) and/or the processing time.

In the first embodiment, a paired pixel control mask was prepared in which paired dot control was performed using a gradation value range of 0-127/255. In other words, paired dot control was performed so the probability k of dots occurring was within the range 0<k<0.5. However, the upper limit can also be limited on the low gradation value side. For example, paired dot control can be performed in a range limited to 0<k<0.2. Because the likelihood of dot overlap occurring due to a shift increases as the size of the dots increases relative to the size of the pixels, a gradation range in which density fluctuation becomes a problem is moved to a lower density. Therefore, it is realistic to change the adjusted range in accordance with the actual size of the dots relative to the pixel size. Also, the lower limit can be limited on the high gradation value side. Generally, the problem of density unevenness is not prominently manifested in the low gradation range near a gradation value of zero, even when the original dot formation positions are far apart and a shift in the formation position of dots occurs. Therefore, a paired pixel control mask can be generated in which the range is limited to 0.1<k<0.4 or 0.2<k<0.5. Also, the percentage of dots formed during forward action and the percentage of dots formed during reverse action is changed from the initial percentages. Here, different dot formation probabilities k1, k2 can be set for them when paired dot control is performed.

B. Second Embodiment

B-1. Dither Mask

The following is a description of the second embodiment of the present invention. The hardware of the printer 20 in the second embodiment is the same as that of the first embodiment (see FIG. 1). The print control process for the printer 20 (FIG. 4) is also the same except that a different dither mask is used in the halftone processing. The halftone processing in the second embodiment also uses the so-called dither method.

The following is a list of the similarities and differences between the dither mask used in the second embodiment and the dither mask used in the first embodiment.
(1) Similarities:
  The size of the dither mask is 64×64 in both.
  The probability K of paired dots occurring is set in both to K=0.8×k$^2$, where k is the probability of dot formation.
  A dispersion-type dither mask is used in both which gives priority to the dispersion properties.
(2) Differences
  In the first embodiment, the threshold values for the 64×64 dither mask were created to take into account only the dispersion properties of the dot distribution formed during forward action and reverse action of the print head 90. By contrast, the dither mask in the second embodiment is created to take into account the dispersion properties of dots in the first pixel group to which the dots formed during forward action of the print head 90 belong and the dots in the second pixel group to which the dots formed during reverse action of the print head 90 belong.

Figure 16A:
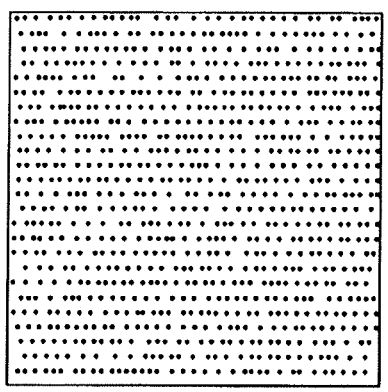
FIG. 16 is a descriptive diagram illustrating the dot distribution during forward action, the dot distribution during reverse action, and the dot distribution during synthesis.
Figure 16B:
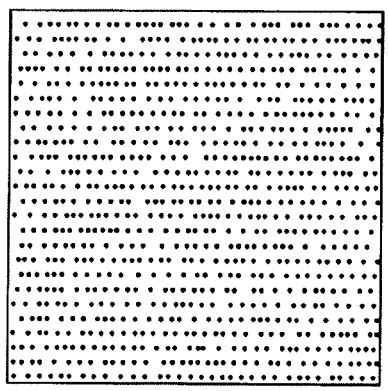
Figure 16C:
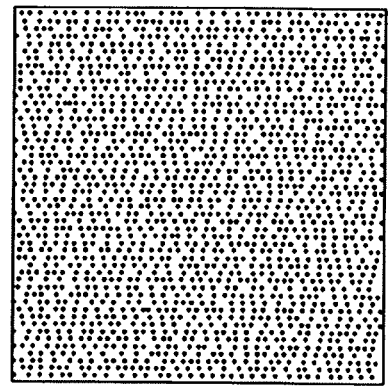

These differences will now be described. An image is formed by the printer 20 from dots formed during forward action of the print head 90 and dots formed during reverse action of the print head. Therefore, the distribution of dots in an image obtained using certain gradation values is a distribution of dots formed during both the forward action and reverse action of the print head 90. Conventionally, the threshold values for the dither mask are decided while targeting higher dispersion properties for the dots in this case. By contrast, the dither mask used in the second embodiment takes into account the dispersion properties of dots in the first pixel group to which the dots formed during forward action of the print head 90 belong and the dots in the second pixel group to which the dots formed during reverse action of the print head 90 belong. In other words, the dither mask used in the second embodiment, as shown in FIG. 16, takes into account the dispersion properties of the dots themselves formed during forward action (FIG. 16A) and the dispersion properties of the dots themselves formed during reverse action (FIG. 16B) when a particular image is formed. Needless to say, in addition to this, the dither mask used in the second embodiment can be said to have a probability K of paired dot occurrence of 0.8×k$^2$. A method for generating such a dither mask is described below, but any method able to generate a dither mask with these characteristics can be used.

A printer 20 of the second embodiment using a dither mask with these characteristics is able to sufficiently suppress deterioration in image quality even when a shift occurs in the position of dots formed during the forward action and reverse action of the print head 90. The reasons are as follows.

(i) In the second embodiment, a dither mask is used which takes into account the dispersion properties of the first pixel group to which dots formed during forward action of the print head 90 belong and the second pixel group to which dots formed during reverse action of the print head 90 belong. In this way, because the dispersion properties of the dots belonging to both groups are guaranteed, even when a shift occurs in the formation position of dots during forward action and reverse action, a decrease in the dispersion properties of the dots in a case in which the dots of both groups overlap in the common region remains very limited. This is because the graininess in a case in which the dots belonging to the two pixel groups are combined indicates a strong correlation with the graininess of the individual dots belonging to each pixel group.

(ii) In the second embodiment, the probability K of paired dots occurring is 0.8×k$^2$. Therefore, as described in the first embodiment, any change in coverage is suppressed or a significant change in the probability of paired dots occurring does not occur even when a shift occurs in the position of dots formed during forward action and reverse action of the print head 90. As a result, deterioration in print quality is suppressed even when a shift in the formation position of dots occurs.

B-2. Dither Mask Generating Method

Figure 17:
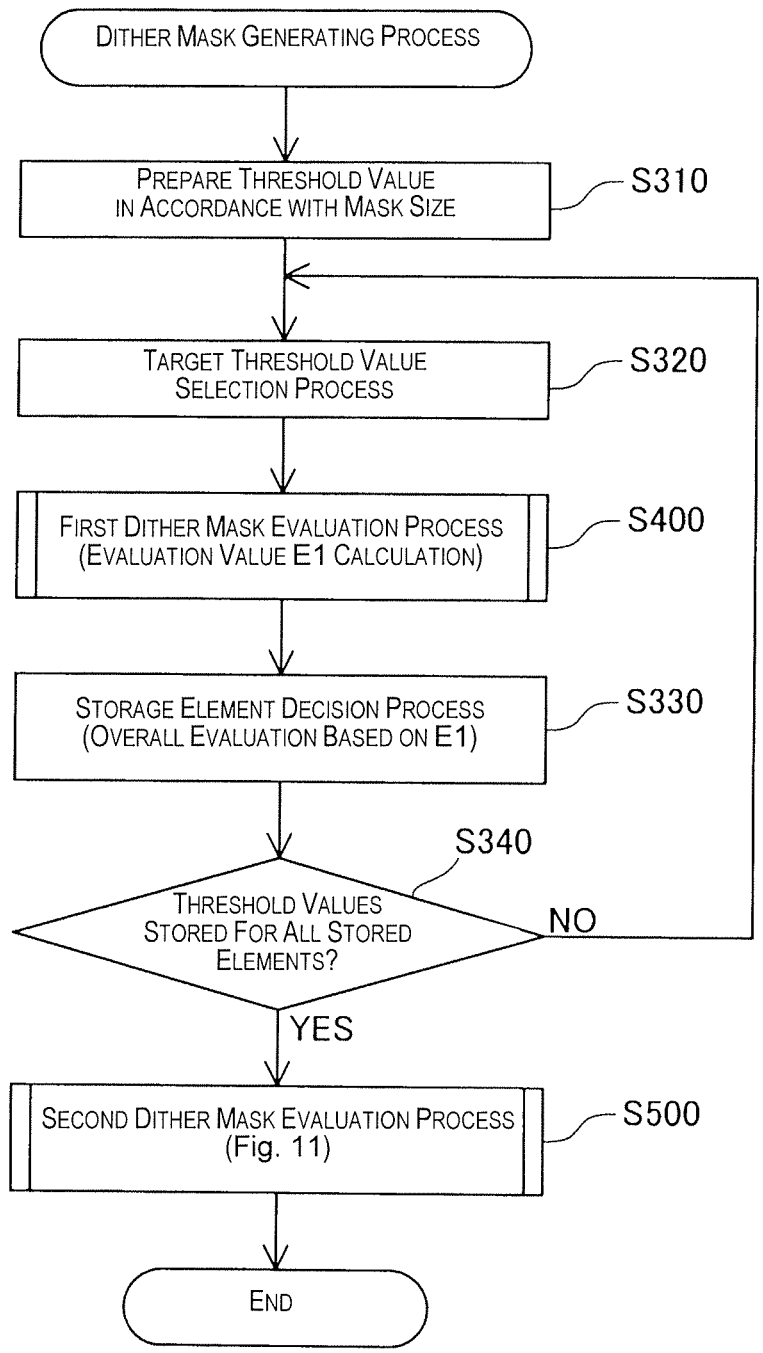
FIG. 17 is a flowchart of the dither mask generating process in the second embodiment.

The steps in the generation method for a dither mask 62 with these characteristics are shown in FIG. 17. As shown, when generating a dither mask 62, threshold values are first prepared based on the size of the dither mask 62 (Step S310). In the second embodiment, the size of the dither mask 62 is 64×64. However, the description has been simplified by using an 8×8 sized mask with 64 storage elements. In Step S310, threshold values 0-63 are prepared. In other words, a threshold value is prepared for each storage element.

Figure 18:
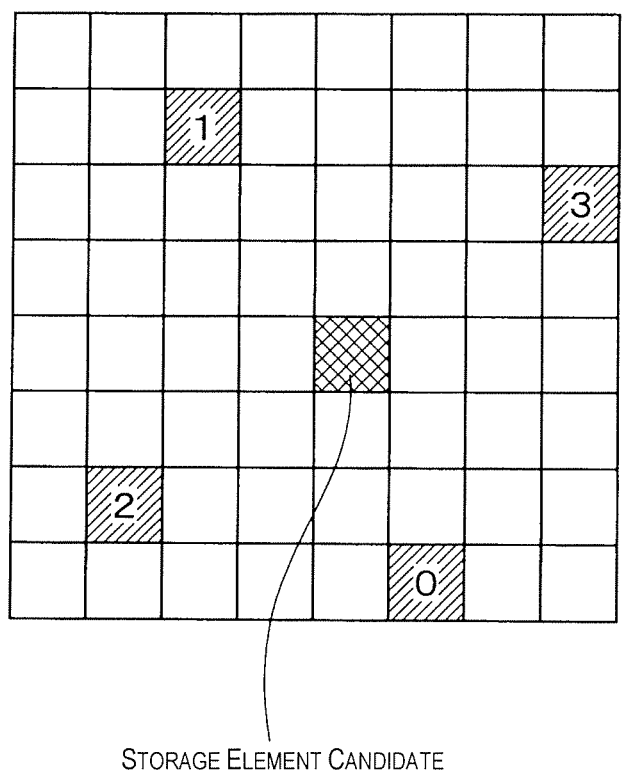
FIG. 18 is a descriptive diagram used to explain the arrangement of stored elements for the reference pixel selection process.

When the threshold values have been prepared, the target threshold value selection process is performed (Step S320). In the target threshold value selection process, a threshold value is selected as a target threshold value among the prepared threshold values 0-63 not yet stored in a storage element. In this embodiment, the target threshold values are selected from among the prepared threshold values in successive order from the smallest to the largest. As shown in FIG. 18, in a case in which threshold values 0-3 have already been stored in storage elements constituting the dither mask by performing the steps described below, the target threshold value selected in the next Step S320 is value 4.

When the target threshold values have been selected, the first dither mask evaluation process is performed (Step S400). In the first dither mask evaluation process, in a case in which a target threshold value is to be stored in a storage element that is not yet storing a prepared threshold value (referred to below as an empty storage element), an evaluation value E1 is calculated for each empty storage element which indicates the extent of dot dispersion in a dot formation pattern indicating the arrangement of storage elements in which threshold values have already been stored (referred to below as decided storage elements). The calculation method for this evaluation value E1 is described below. However, in this embodiment, a smaller evaluation value E1 indicates better dot dispersion properties and is good from the standpoint of the graininess of the printed image.

Next, the stored element is decided using the evaluation value E1 (Step S330), and it is determined whether or not the deciding process has been completed for all of the storage elements (Step S340). When the process has not been completed for all of the storage elements, the process returns to Step S320, and the process described above is repeated.

When the first dither mask evaluation process described above has been performed and threshold values have been stored in all of the storage elements (YES in Step S340), the temporary dither mask has been completed. Next, the second dither mask evaluation process is performed (Step S500). The second dither mask evaluation process is equivalent to the process performed in the first embodiment in which the paired pixel control mask is generated. When the paired pixel control mask in the first embodiment is generated, the process starts with a blue noise mask (FIG. 12, Step S200). In the second dither mask evaluation process in the second embodiment, the process starts with the temporary dither mask obtained from the first dither mask evaluation process. The dither mask used in the second embodiment is generated in the manner described above.

B-3. First Dither Mask Evaluation Process

Figure 19:
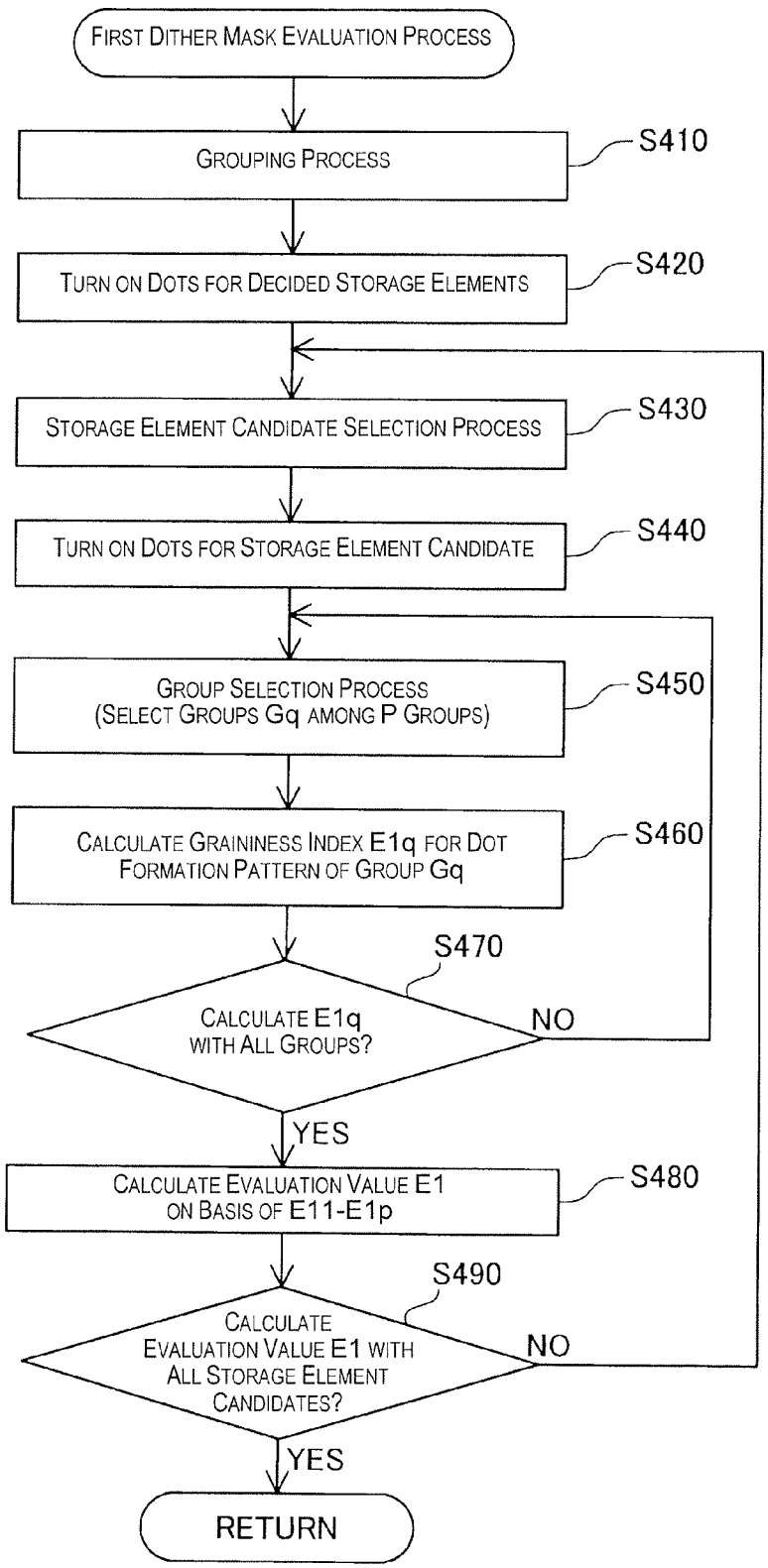
FIG. 19 is a flowchart of the first dither mask evaluation processing.

Using FIG. 19, the following is a description of the first dither mask evaluation process in the dither mask generating process described above. In the first dither mask evaluation process, a grouping process is performed first as shown in FIG. 19 (Step S410). In the grouping process, the plurality of storage elements constituting the dither mask are divided into a plurality of groups, focusing on whether the threshold values stored in the plurality of storage elements form dots in the dot formation positions applied in the halftone processing during forward action or reverse action. In other words, groups of storage elements are set on the basis of the placement mode for dots formed during forward action of the print head and dots formed during reverse action of the print head (in the second embodiment, the alternating column mode shown in FIG. 3A is used). The groups are set on the basis of different timings in a case in which the ink ejection position is changed relative to the print medium in the common printing region of the print medium and ink is ejected from the print head to form dots on a plurality of different timings. Instead of, or in addition to, forward action and reverse action, main scanning can be performed successively (main scanning can be performed several times) on a plurality of different timings in a case in which dots are formed in a common printing region N times (N being three or more times) in the main scanning direction.

When the grouping process has been performed, the dots in the decided storage elements are turned ON (Step S420). In FIG. 18, the single hatching indicates the dots in the decided storage elements which are storing threshold values 0-3 and which have been turned ON. When the dots in the decided storage elements have been turned ON, the storage element candidate selection process is performed (Step S430). In the storage element candidate selection process, storage elements that are candidates for storing the target threshold value are selected. Because a target threshold value can be stored in each of the empty storage elements, one of the empty storage elements is selected as a storage element candidate. When the storage element candidate selection process has been performed, the dot in the storage element candidate is turned ON (Step S440). In FIG. 18, the cross-hatching indicates the selection of an empty storage element as the storage element candidate and the turning ON of the dot for that storage element candidate.

When the dot for the storage element candidate has been turned ON, the group selection process is performed (Step S450). In the group selection process, a group Gq (where q is an integer from 1 to p) is selected from among p groups G1-Gp set in Step S410 (p is an integer equal to or greater than 2, and here p=2).

Figure 20:
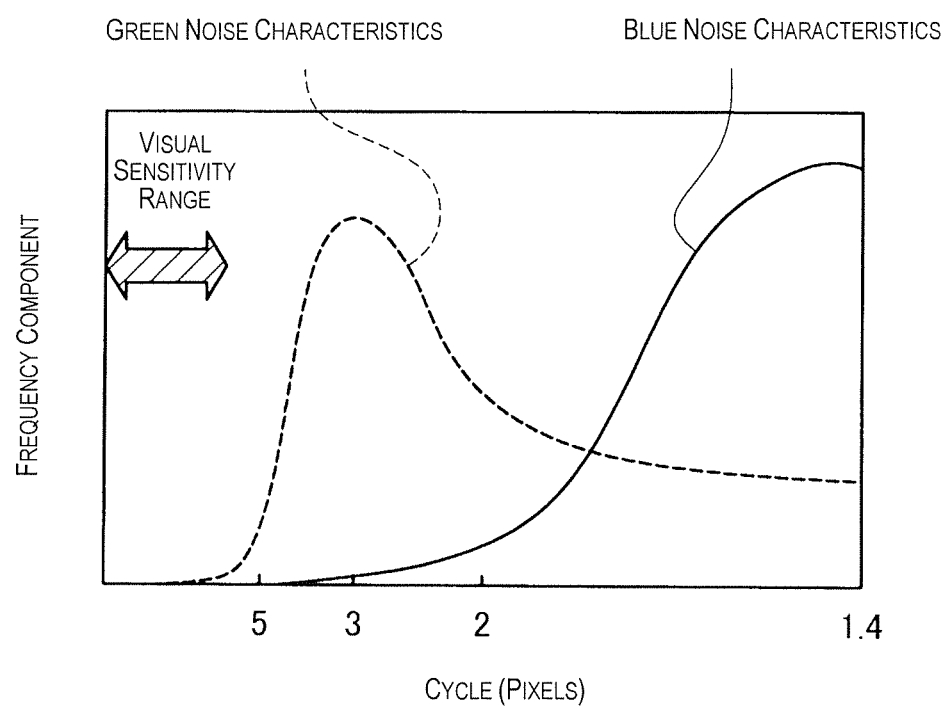
FIG. 20 is a descriptive diagram showing an example of blue noise characteristics and green noise characteristics.

When group Gq has been selected, evaluation value $E1q$ indicating the degree of dot dispersion is calculated on the basis of the dot formation pattern corresponding to the storage elements belonging to group Gq. In other words, an evaluation value indicating the degree to which the dots are dispersed evenly is calculated (Step S460). As is well known, a dither mask can be generated with blue noise characteristics or green noise characteristics as shown in FIG. 20 in order to form dots that are dispersed evenly. In this embodiment, the graininess index described in the first embodiment is used as the evaluation value indicating the degree to which the dots are dispersed evenly, in order to generate a dither mask with these characteristics.

When the evaluation value $E1q$ has been calculated, Step S450 and Step S460 are repeated until an evaluation value $E1q$ has been calculated for all of the groups G1-Gp (here, G1-G2) (Step S470). When evaluation values $E1q$ have been calculated for all groups G1-G2 (YES in Step S470), an evaluation value E1 is calculated on the basis of the calculated evaluation values E11-E12 using Equation (3) (Step S480). In Equation (3), d-e are weighting factors. These weighting factors have been determined experimentally as constants so as to obtain good print quality. In other words, evaluation value E1 is a weighted overall evaluation value for the degree of dot dispersion in the dot formation pattern indicated by all of the decided storage elements in the dither mask, the dot formation pattern indicated by the decided storage elements corresponding to forward action, and the dot formation pattern indicated by the decided storage elements corresponding to reverse action.

$$E1 = d \times E11 + e \times E12 \quad (3)$$

When the evaluation value E1 has been calculated, Step S430 through Step S480 are repeated until evaluation values E1 have been calculated for all of the storage element candidates (empty storage elements) (Step S490). When evaluation values E1 have been calculated for all of the storage element candidates (YES in Step S490), the first dither mask evaluation process has been completed. In this evaluation, the graininess of the first pixel group and the graininess of the second pixel group are the targets. However, the graininess of the combined dots from both the first and the second pixel groups can also be the target of evaluation.

When these evaluation values E1 are used, a first dither mask DM1 can be generated having a dot formation pattern in which the dot placement is dispersed, whether the dots are formed during forward action or the dots are formed during reverse action. Next, the second dither mask evaluation process is performed using this first dither mask DM1 as the starting point. Because the second dither mask evaluation process is similar to the method for generating the paired pixel control dither mask in the first embodiment (FIG. 12), the description of this process has been omitted.

When halftone processing is performed using such a dither mask 62, the dispersion properties of forward action dots and reverse action dots can be ensured even when there is a position shift between forward action dots and reverse action dots. As a result, the dispersion properties of the dots in the entire image can be ensured, and deterioration in the graininess of the image quality can be suppressed.

C. Third Embodiment

Figure 21:
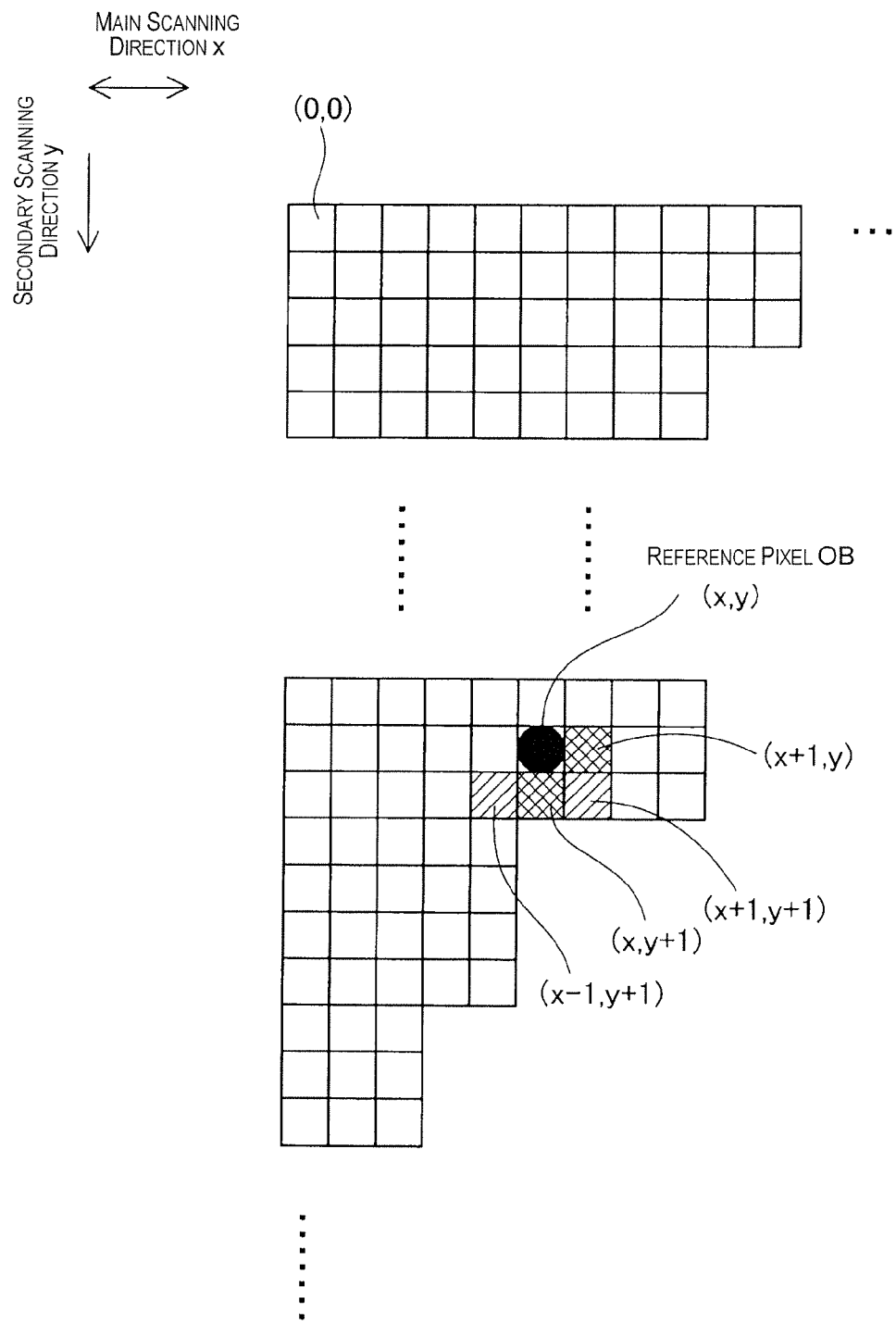
FIG. 21 is a descriptive diagram used to explain the processing in the third embodiment.

The third embodiment of the present invention will now be described. Because the third embodiment is realized using hardware similar to that in the first and second embodiments, a description of the internal configuration of the printer 20 has been omitted. The difference with respect to the first and second embodiment is that the error diffusion method is used in the halftone processing performed by the printer 20. In the third embodiment, as shown in FIG. 21, the upper right of the image data is (0,0), the main scanning direction is x, the secondary scanning direction is y, and the reference pixel is OB (x,y). These are used to successively determine whether or not a dot is to be formed. The resulting density error (the difference between the gradation value to be realized by the target pixel and the density actually realized by the presence or absence of dot formation) is then diffused in the surrounding pixels. As shown in FIG. 21, in the third embodiment, one-quarter of the density error is distributed to each of the four pixels surrounding the reference pixel (x+1,y), (x−1,y+1), (x,y+1), (x+1,y+1). The error distribution rate can be different depending on the pixel error, and the pixel distribution range can be narrowed or expanded. The error distribution range can also be switched depending on the gradation value of the image.

In the third embodiment, in order to control the occurrence of paired dots, diffusion data for two paired dots $Ped0(x,y)$, $Ped1(x,y)$ is calculated, and this is used to control the probability of paired dots occurring. This control is described using FIG. 22. In the third embodiment, as in the first embodiment, the pixels in which dots are formed during forward action of the print head 90 and the pixels in which dots are formed during reverse action of the print head are arranged in an alternating manner in the main scanning direction and the secondary scanning direction as shown in FIG. 3C. Considered paired dots, as shown in FIG. 23, are pixels NL to the left of the reference pixel OB in the main scanning direction, and pixels NU up above the reference pixel in the secondary scanning direction.

Figure 22:
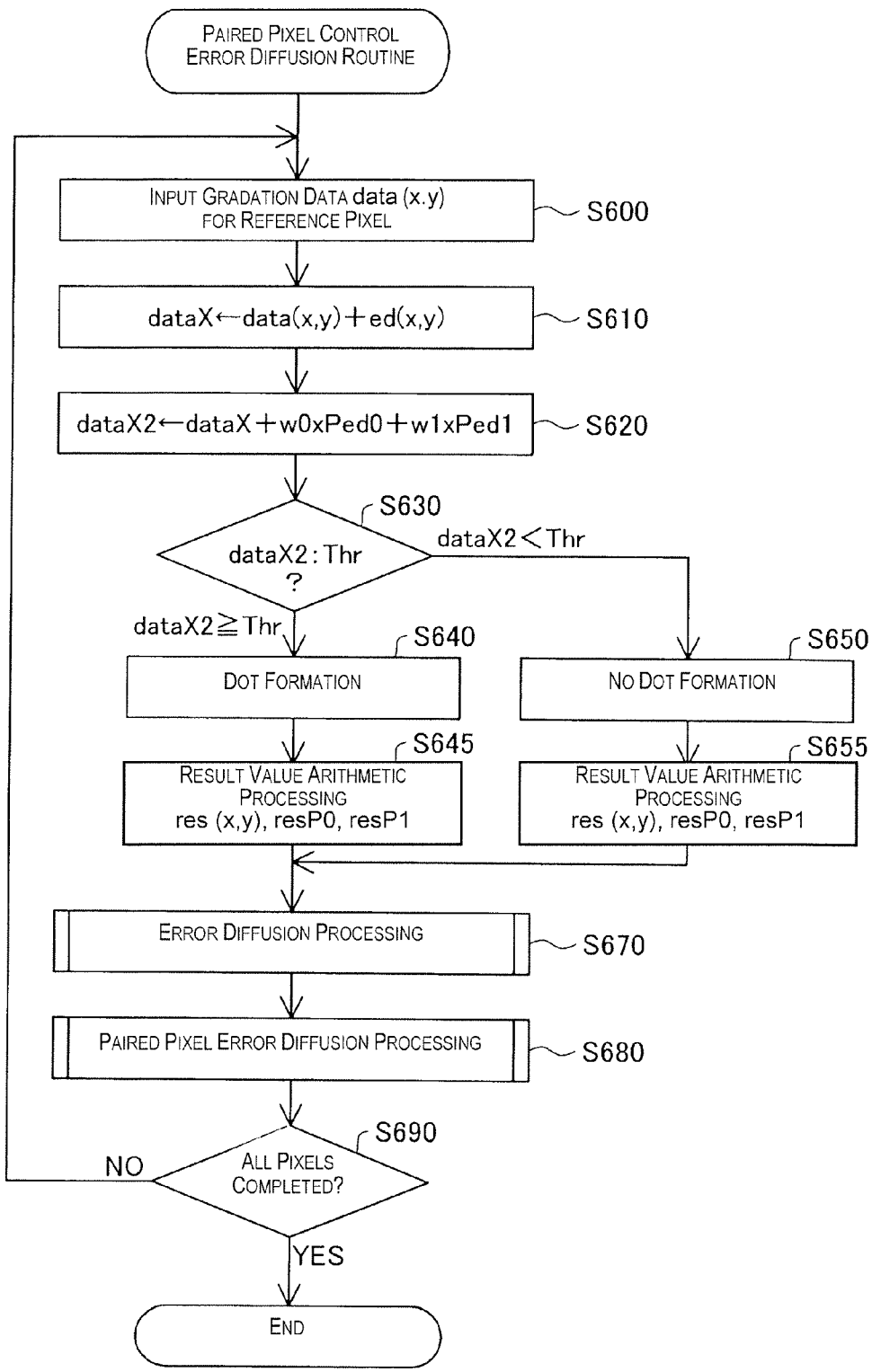
FIG. 22 is a flowchart of the halftone processing in the third embodiment.
Figure 23:
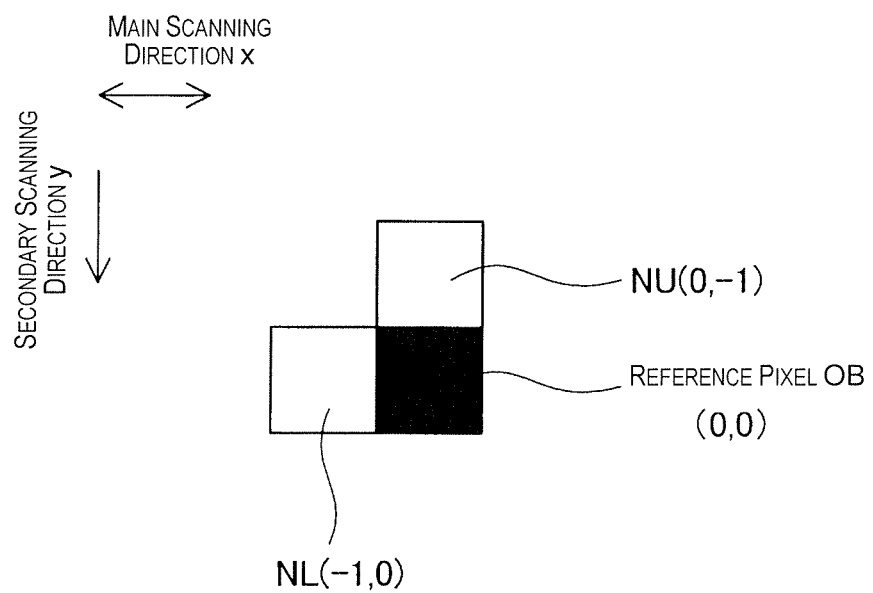
FIG. 23 is a descriptive diagram showing adjacent pixels in the third embodiment.

In the paired pixel control error diffusion routine shown in FIG. 22, the reference pixel OB moves successively in the main scanning direction and the secondary scanning direction from the upper left (0,0) of the image. First, the gradation data (x,y) of the reference pixel is inputted (Step S600). The gradation data (x,y) is data indicating the gradation value of the pixel positioned at (x,y) in the image.

Next, the arithmetic operation in Equation (4) is performed on the gradation data data (Step S610).

$$dataX \leftarrow data(x,y) + ed1(x,y) \quad (4)$$

In this arithmetic operation, the gradation data data is corrected using diffusion data $ed1(x,y)$ from processed pixels surrounding the reference pixel. The arithmetic operation performed on diffusion data is described in detail below, and diffusion data $ed1(x,y)$ is the sum total of error data diffused from the pixels determined to form dots towards the reference pixel OB (x,y).

In this embodiment, the arithmetic operation shown in Equation (5) is performed on the corrected data dataX (Step S620).

$$dataX2 \leftarrow dataX + w0 \times Ped0 + w1 \times Ped1 \quad (5)$$

Here, Ped0, Ped1 is paired pixel diffusion data from the processed pixels. Paired pixel diffusion data Ped0, Ped1 determines whether or not the probability of paired dots being formed in both the reference pixel OB and the adjacent pixels NL, NU shown in FIG. 23 is deficient with respect to the prediction value for the probability of paired dots occurring. This point will be described in greater detail.

Because the range of gradation data is expressed by 0-255 when the gradation value of a reference pixel OB is expressed by 8-bit gradation data data, the probability PK (referred to as the incidence below) that a dot will be formed in both the reference pixel and an adjacent pixel is $PK=(data/255)^2$. For the sake of arithmetic operational efficiency, the incidence PK is treated as $PK=(data)^2/255$ inside the printer 20. In a case in which the gradation values in the image are uniform, the paired dot incidence in the main scanning direction and the paired dot incidence in the secondary scanning direction are treated as the same value. However, in reality, the gradation data data for the reference pixel and each adjacent pixel could be different, so these are distinguished from each other and treated as $PK0(x,y)$, $PK1(x,y)$.

Concerning the paired dot incidence, when it has been determined (described below) whether or not a dot has been formed with respect to the reference pixel OB, it is also determined whether or not paired dots have been formed. The determination results are used to diffuse the shift from the prediction value for the paired dot incidence to the surrounding pixels. This diffusion is described in detail below. However, the error diffusion portion $\Delta pk0(x,y)$, $\Delta pk1(x,y)$ of the prediction values for the incidence from the surrounding pixels is used to determine the paired pixel diffusion data Ped0, Ped1 from Equation (6) below.

$$Ped0 \leftarrow PK0(x,y) + \Delta pk0(x,y)$$

$$Ped1 \leftarrow PK1(x,y) + \Delta pk1(x,y) \quad (6)$$

The arithmetic operation in Equation (5) is performed using the paired pixel diffusion data Ped0, Ped1 determined in Equation (6) to determine the corrected gradation data dataX2. In Equation (4), w0, w1 are weighting factors for adjusting the paired dot incidence. The value should be 1 in a case in which the paired dot incidence approaches the incidence in a white noise mask. In a case in which the graininess of the image is the emphasis, the weighted factors should be less than 1.

When the corrected gradation data dataX2 has been determined, the sizes of the corrected gradation data dataX2 and the threshold value Thr are compared (Step S630). The threshold value Thr used in the comparison can be a fixed value (for example, 127) or a value that depends on the gradation data data. When the threshold value Thr is a value that depends on the gradation data data, phenomena such as tailing can be eliminated.

When, as a result of the determination in Step S630, the corrected gradation data dataX2 is greater than the threshold value Thr, a dot is formed. The value 1 is assigned to the dot data Ddata (x,y) (Step S640), and an arithmetic operation is performed on the result indicating a case of dot formation (Step S645). When, as a result of the determination in Step S630, the corrected gradation data dataX2 is less than the threshold value Thr, a dot is not formed. The value 0 is assigned to the dot data Ddata (x,y) (Step S650), and an arithmetic operation is performed on the result indicating a case of no dot formation (Step S655). The value of the dot data Ddata(x,y) is referenced during the interlacing explained in the first embodiment, and dot formation is performed in accordance with this data.

The following is a description of the arithmetic operations performed on the result values in Step S645 and Step S655. In a case in which a dot is formed in the reference pixel OB (Step S640) and in a case in which a dot is not formed in the reference pixel (Step S650), the density realized in the reference pixel OB has to be determined and prepared for the subsequent error diffusion process. This is a result value res(x,y) related to the gradation value. In this embodiment, the paired dot incidence is controlled. Similarly, whether or not paired dots occur with respect to the reference pixel OB is determined as result value resP0, resP1.

More specifically, the result value res(x,y) for the gradation value is 255 in a case in which a dot is formed in the reference pixel OB (Step S640), and 0 in a case in which a dot is formed in the reference pixel (Step S650). The result value does not have to be set to 255 or 0. For example, in a case in which a low concentration ink and/or small-diameter ink droplet is used, the result value when a dot is formed can be 96. In other words, the concentration of the ink and the size of the ink droplet can be combined in setting the value when a dot is formed. When the color of the printing paper P is a color other than white, the result value when a dot is not formed can be a predetermined value greater than zero. Preferably, the setting is used to adjust the density of the image that is actually printed.

Figure 24:
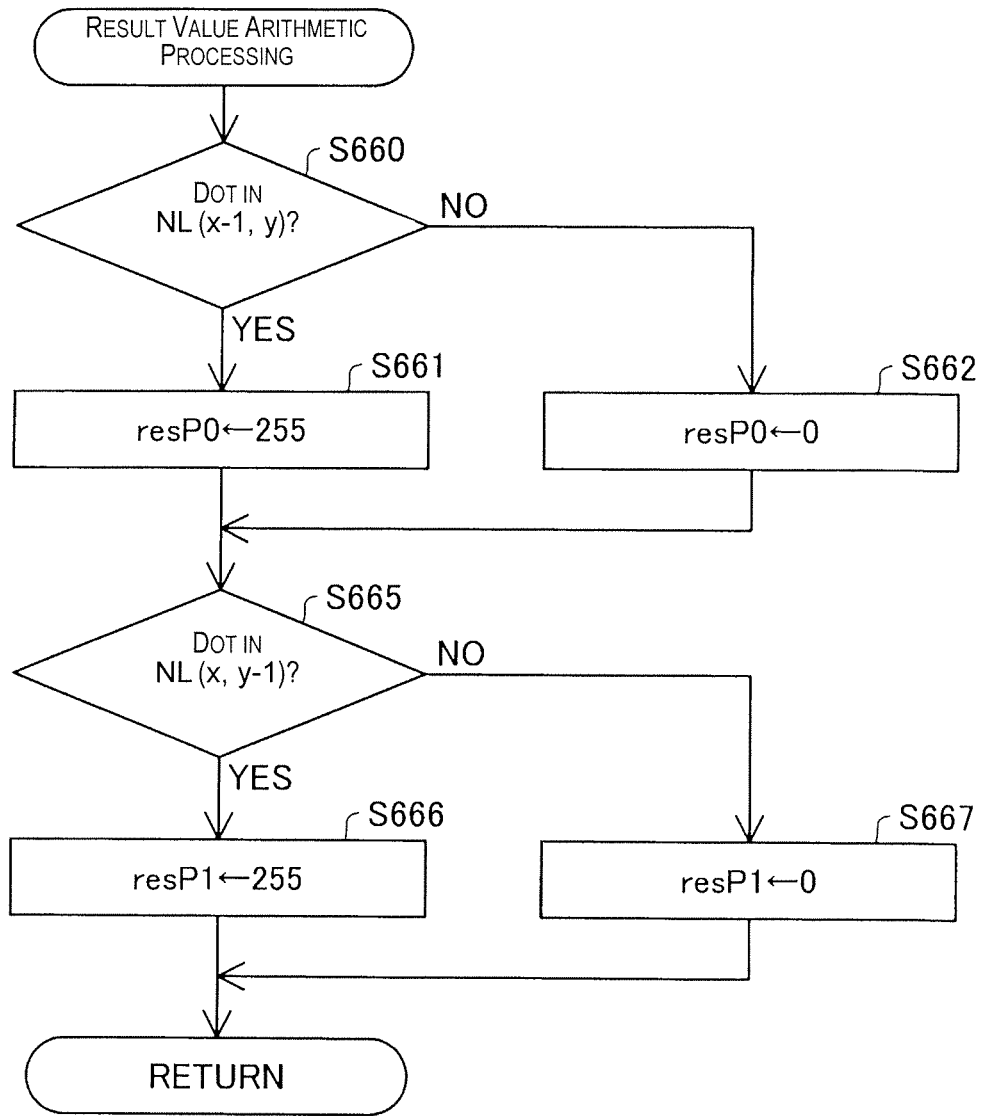
FIG. 24 is a flowchart of the result value setting process for controlling the number of paired dots in the third embodiment.

In this embodiment, the result value for paired dots resP0, resP1 is determined along with the result value res(x,y) for the gradation value (Step S645, Step S655). This is used to bring the paired dot incidence closer to the prediction value. More specifically, in a case in which it has been determined that a dot is to be formed in the reference pixel OB (Step S640), as shown in FIG. 24, it is determined whether or not a dot is formed in the adjacent pixel NL(x−1,y) to the left of the reference pixel OB(x,y) (Step S660). When a dot is formed, paired dots occur and the value 255 is set in resP0 (Step S661). When a dot is not formed in the adjacent pixel NL, paired dots do not occur and the value 0 is set in resP0 (Step S662).

Whatever the determination result for adjacent pixel NL, it is determined whether or not a dot is formed in the adjacent pixel NU(x,y−1) above the reference pixel OB(x,y) (Step S665). When a dot is formed, paired dots occur and the value 255 is set in resP1 (Step S666). When a dot is not formed in the adjacent pixel NU, paired dots do not occur and the value 0 is set in resP1 (Step S667).

In a case in which a dot is not formed in Step S650, a paired dot does not occur with either the adjacent pixel NL to the left of the reference pixel OB(x,y) or the adjacent pixel NU above the reference pixel, so the value 0 is set in both result values resP0, resP1 (Step S655).

The processing described above is performed to determine dot formation in the reference pixel OB, and complete processing of paired pixel diffusion data for error diffusion and paired pixel control. Next, the error diffusion processing (Step S670) and the paired pixel error diffusion processing (Step S680) are executed in successive order. Because error diffusion processing is well known, the description has been simplified. In this process, the difference between the result value res(x,y) set in Step S645 or Step S655 and the gradation dataX for the reference pixel OB corrected using error diffusion (arithmetic operation in the first equation) is determined, and this is distributed to the four surrounding pixels shown in FIG. 21. More specifically, the density error ed and the error diffusion buffer er are determined using the following equations.

$$ed = dataX - res(x,y)$$

$$er(x+1,y) = er(x+1,y) + ed/4$$

$$er(x-1,y+1) = er(x-1,y+1) + ed/4$$

$$er(x,y+1) = er(x,y+1) + ed/4$$

$$er(x+1,y+1) = er(x+1,y+1) + ed/4$$

Therefore, the diffusion data ed1(x,y) described in Step S610 in FIG. 22 corresponds to the sum total for each pixel of the error diffused to each error diffusion buffer er in the arithmetic operation from each pixel surrounding the reference pixel.

Similarly, in the paired pixel error diffusion process, the diffusion data Ped0(x,y) for the adjacent pixel NL in the main scanning direction and the diffusion data Ped1(x,y) for the adjacent pixel NU in the secondary scanning direction are determined, and the incidence errors Perr0, Perr1 and the paired pixel error diffusion buffers erP0, erP1 for each are determined using the following equations.
Related to Adjacent Pixel NL:

$$Perr0 = Ped0 - resP0$$

$$erP0(x+1,y) = erP0(x+1,y) + Perr0/4$$

$$erP0(x-1,y+1) = erP0(x-1,y+1) + Perr0/4$$

$$erP0(x,y+1) = erP0(x,y+1) + Perr0/4$$

$$erP0(x+1,y+1) = erP0(x+1,y+1) + Perr0/4$$

Related to Adjacent Pixel NU:

$$Perr1 = Ped1 - resP1$$

$$erP1(x+1,y) = erP1(x+1,y) + Perr1/4$$

$$erP1(x-1,y+1) = erP1(x-1,y+1) + Perr1/4$$

$$erP1(x,y+1) = erP1(x,y+1) + Perr1/4$$

$$erP1(x+1,y+1) = erP1(x+1,y+1) + Perr1/4$$

Therefore, the error diffusion portions $\Delta pk0(x,y)$, $\Delta pk1(x,y)$ described using Equation (3) in Step S620 of FIG. 22 correspond to the sum total for each pixel of the error with the prediction value related to the paired dot incidence diffused to each paired pixel error diffusion buffer erP0, erP1 using the arithmetic operation from each pixel surrounding the reference pixel.

After this processing has been performed, it is determined whether the processing of all of the pixels constituting the image has been completed (Step S690). When determination for all of the pixels has not been completed, the process returns to Step S600, the reference pixel is advanced one increment, and the processing is repeated from the input of gradation data data(x,y) for the reference pixel. When determination for all of the pixels has been completed, the process is exited at END, and the processing routine is completed.

In the third embodiment described above, the paired dot incidence is brought closer to the prediction value while error diffusion is performed. In this embodiment, the prediction value is the square of the dot incidence. As in the first embodiment, the weighting factors can be adjusted w0, w1 to obtain a value of approximately 0.8, which is a white noise characteristic. Because the algorithm in this embodiment basically employs error diffusion, the dot distribution properties are close to blue noise characteristics and very good. In addition, because the paired dot incidence is controlled so as to be at the same level as white noise characteristics, the coverage and paired dot incidence do not change very much even when a shift occurs in the dot formation position of dots during forward action and reverse action of the print head 90. As a result, image quality deterioration can be sufficiently suppressed even when there is a shift in the formation position of dots in bi-direction printing.

Also, in this embodiment, the processing related to paired pixels is added to the error diffusion algorithm. As a result, the processing routine can be realized via slight corrections and additions. Because control of the error diffusion range for gradation data and the paired dot incidence can be realized using variables, the error diffusion algorithm does not have to be changed even in a case in which the bi-directional printing mode and/or the paired pixel range has been changed as shown, for example in FIG. 8 and FIG. 15. Alternately, the error diffusion range is easy to change without altering paired pixel control.

D. Fourth Embodiment

D-1. Device Configuration

Figure 25:
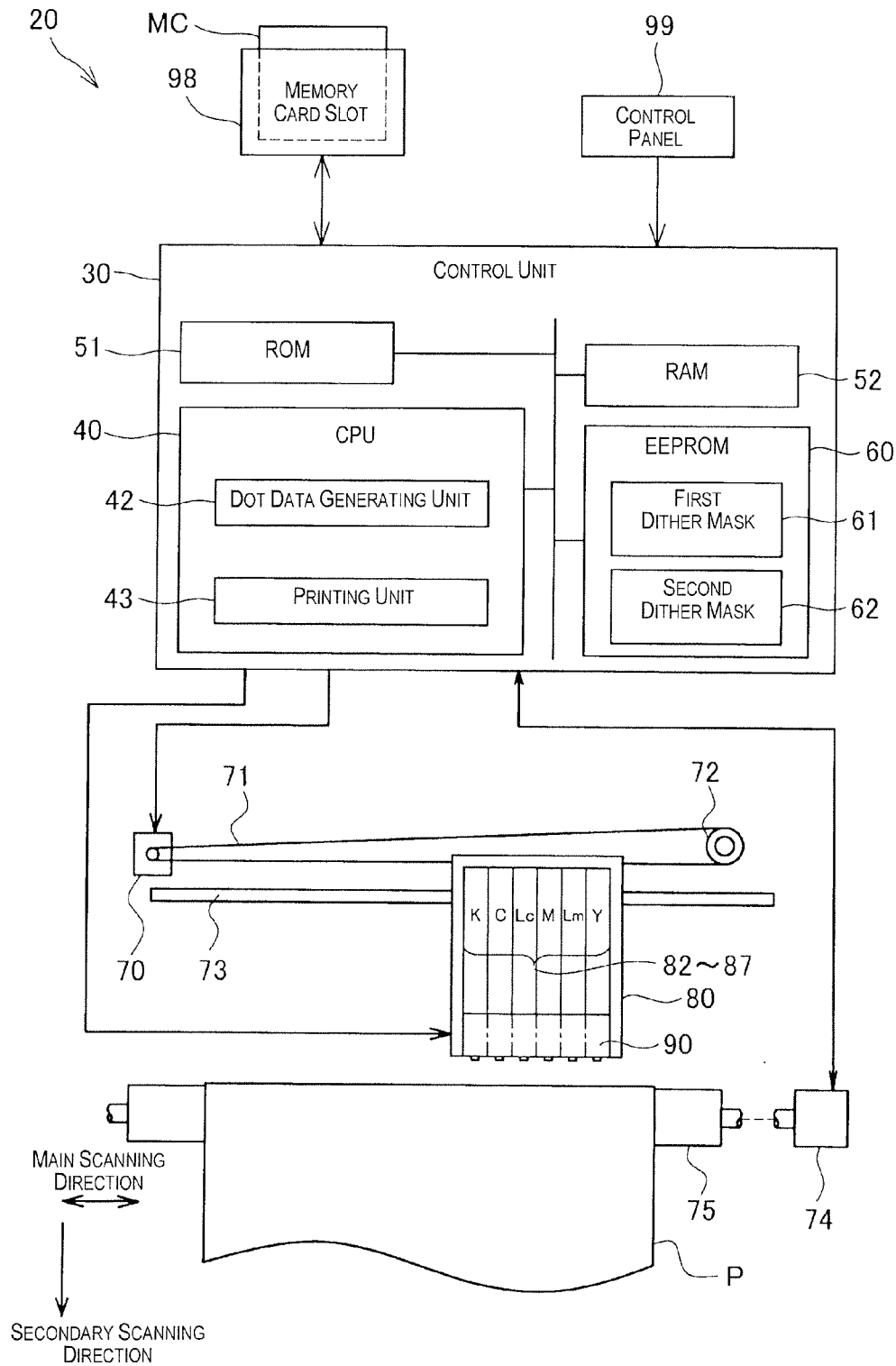
FIG. 25 is a schematic block diagram of the printer 20 in the fourth embodiment.

The following is a description of the fourth embodiment of the present invention. FIG. 25 is a schematic block diagram of the printer 20 in the fourth embodiment. The hardware of the printer 20 in the fourth embodiment is the same as that of the first embodiment (see FIG. 1) except that the contents of the dither mask stored in the EEPROM 60 are different. Description of the internal configuration of the printer 20 that is the same as that of the first embodiment has been omitted. In the fourth embodiment, the printing process performed by the printer 20 differs from that of the first embodiment (see FIG. 4).

Two dither masks are stored in the EEPROM 60 of the fourth embodiment. The size of the first and second dither masks 61, 62 used in this embodiment is 64×64, and threshold values from 0 to 256 are stored in 4096 storage elements. Each threshold value is used in the halftone processing described below. In the first and second dither masks 61, 62, the placement of each threshold value is decided so that the characteristics basically emphasize the dispersion properties of the dots. The characteristics of the first and second dither mask 61, 62 used in this embodiment are described below, but the first dither mask 61 is a so-called blue noise mask, and the second dither mask 62 is a dither mask for suppressing any deterioration in image quality and realizing high image quality in bi-directional printing.

D-2. Printing Process

Figure 26:
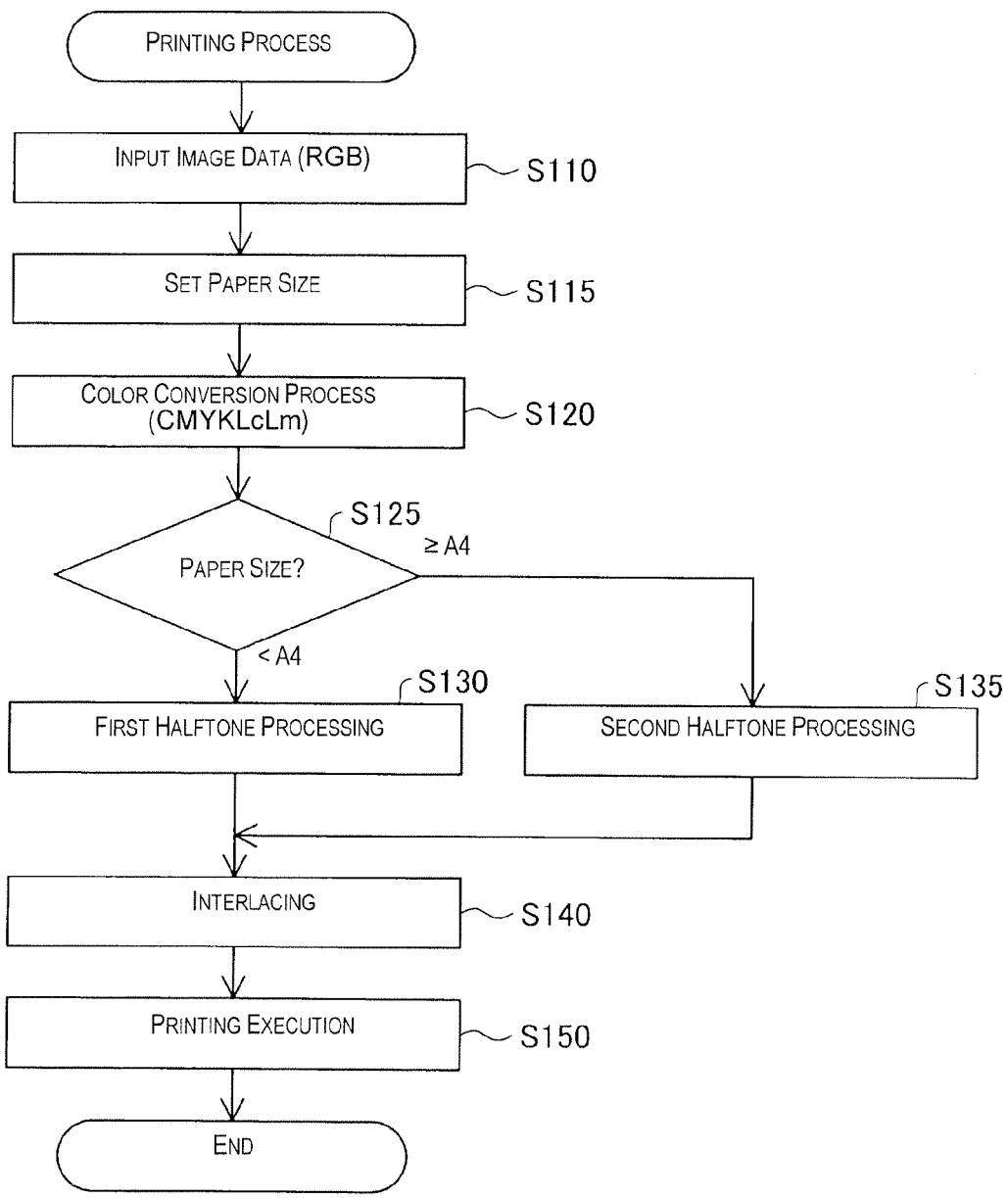
FIG. 26 is a flowchart of the printing process in the fourth embodiment.

The printing process performed by the printer 20 in this embodiment will now be described. FIG. 26 is a flowchart of the printing process performed by the printer 20 in this embodiment. The step numbers in the flowchart used to explain this embodiment are the step numbers of the flowchart in FIG. 26. Here, the user operates the control panel 99 to initiate the printing process by performing a printing instruction operation for a predetermined image stored in the memory card MC. When the printing process has been initiated, the CPU 40 first reads and inputs the RGB-formatted image data ORG to be printed from the memory card MC via the memory card slot 98 (Step S110).

When the image data ORG has been inputted, the setting for the paper to be printed is received (Step S115). Here, the user sets the paper size using the control panel 99. A particular paper size (such as A4) is set as the default setting, and the default paper size is used unless otherwise indicated by the user. The paper size setting is stored in the PageSize variable, and this is referenced in the subsequent processing. After the paper size has been set, the CPU 40 references the look-up table (not shown) stored in the EEPROM 60, and performs color conversion on the image data ORG from the RGB format to the CMYKLcLm format (Step S120).

When the color conversion process has been completed, the paper size is determined (Step S125). The paper size is determined by referencing the PageSize variable saved in advance. As a result of the paper size determination, the CPU 40 performs the first halftone process when the paper size is less than A4 such as in the case of photographic paper (cabinet size, L size, 2 L size, and the like) (Step S130), and performs the second halftone process when the paper size is A4 or greater (Step S135). Whether the first or second halftone process is performed, the CPU 40 performs the processing of the dot data generating unit 42 and performs halftone processing in which the image data is converted to ON/OFF data for the dots of each color. Only the content of the process is different. In this embodiment, the first and second halftone processes are performed using the dither method. The first and second dither mask 61, 62 used in this process are repeatedly applied in the main scanning direction and the secondary scanning direction depending on whether the inputted data is aligned in the main scanning direction or the secondary scanning direction. The first and second halftone processing in this embodiment is controlled so that the generated dot data has predetermined characteristics. The content of the control depends on the characteristics of the first and second dither masks 61, 62. The first and second halftone processes are not limited to binary ON/OFF dot processing. It can also be multi-value processing such as ON/OFF processing of large dots and small dots. Also, the image data provided to the halftone process can be obtained from image processing such as resolution conversion processing and smoothing processing.

When either the first or second halftone process is performed, the CPU 40 performs overlapping and interlacing alternatingly aligned with respect to dot data to be printed in a single main scanning unit, harmonized with the nozzle arrangement of the printer 20, the paper feed rate, and other parameters (Step S140). When the overlapping and interlacing have been performed, the CPU 40 performs the processing of a printing unit 43, driving the print head 90, carriage motor 70, and motor 74, and executing the printing (Step S150).

When the printing process is executed (FIG. 26), dot formation is performed using either the first dither mask 61 or the second dither mask 62 depending on the paper size. The printer 20 forms dots by ejecting ink from the print head on a plurality of different timings (in other words, forward action and reverse action) in the common print region of the print medium while changing the ink ejection position with respect to the print medium, and a printed image is outputted in which the dots formed during the forward action and the dots formed during the reverse action are aligned with each other.

D-3. Halftone Processing

The following is a description of the characteristics of the halftone process in this embodiment. In this embodiment, the first or second halftone process is performed depending on the set size of the paper (Step S130 or Step S135). The first halftone process shown as Step S130 in FIG. 26 will be described first. In the first halftone process, whether or not to form a dot in a pixel position is decided by comparing the gradation values of a pixel belonging to a first pixel group belonging to a dot to be formed during forward action of the print head 90 and a pixel belonging to a second pixel group belonging to a dot to be formed during reverse action of the print head 90 to the first dither mask 61 stored in the EEPROM 60. The first dither mask 61 used in the first halftone process is a so-called blue noise mask, and a dot ON/OFF decision is made by comparing the gradation value of image data to the threshold value for the corresponding position in the first dither mask 61.

A blue noise mask is a dither mask in which the threshold values are arranged so that the arrangement of dots to be generated has blue noise characteristics. In blue noise characteristics, the distribution of dots formed has a noise characteristic possessing a peak in the spatial frequency region on the higher-frequency side relative to the low-frequency region at or below a predetermined spatial frequency. These characteristics give strong priority to the dispersion properties of the dots. Dot data is generated in the first halftone process using this blue noise mask. As a result, when the paper size is less than A4, for example, a photo size (L size), the dispersion properties of the dots is given priority, and dot data is generated to perform high-quality printing with superior graininess. In the first halftone process, no distinction is made between the first and second pixel groups when compared to the threshold values in the dither mask.

The second halftone process will be described next. In the second halftone process (Step S135), dot data is also generated via a comparison to a threshold value in the dither mask. However, a second dither mask 62 is used in the second halftone process. The second dither mask 62 in this embodiment has the same content as the dither mask 62 in the first embodiment (see FIG. 1), and the generation method is the same as the generating method used by the dither mask in the first embodiment (FIG. 12). Therefore, further description has been omitted.

D-4. Effect of the Fourth Embodiment

In the printer 20 of the fourth embodiment having the configuration described above, image data ORG is received, and the control unit 30 performs the processing shown in FIG. 26 to print an image on printing paper P. In a case in which the size of the printing paper P is less than A4, for example, photograph size (L-size, or the like), halftone processing is performed and dot data generated using the first dither mask 61 which has blue noise characteristics. In a case in which the size of the printing paper P is A4 or greater, halftone processing is performed and dot data generated using the second dither mask 62 in which the probability of dots being formed in paired pixels is high. In both cases, the data is converted to the final dot distribution. As a result, in a case in which the paper size is small, an image can be formed with an especially sparse dot distribution and superior graininess in the low gradation region. In a case in which the paper size is large, the second dither mask 62 is used to increase the quality of an A4-size image to the human eye, which is usually viewed from a greater distance than a photograph-sized image. Here, the change in the percentage of paired dots formed in the 0-127 gradation region hardly changes, and density unevenness is less likely to occur.

E. Fifth Embodiment

The following is an description of the fifth embodiment of the present invention. The hardware of the printer 20 in the fifth embodiment is the same as that of the fourth embodiment (see FIG. 25). In the fifth embodiment, the printing process performed by the printer 20 differs from that of the fourth embodiment (see FIG. 26).

E-1. Printing Process

Figure 27:
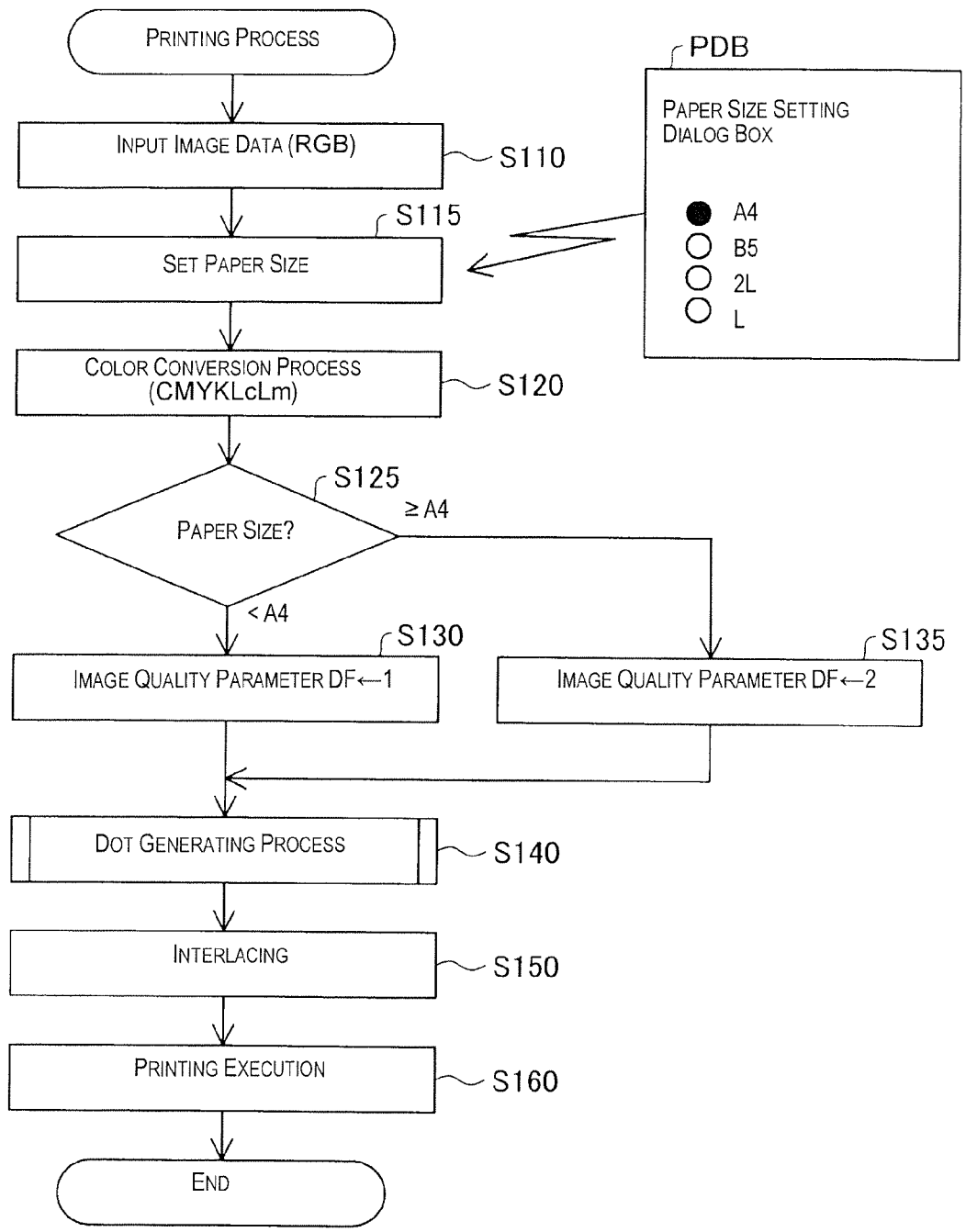
FIG. 27 is a flowchart of the printing process in the fifth embodiment.
Figure 28:
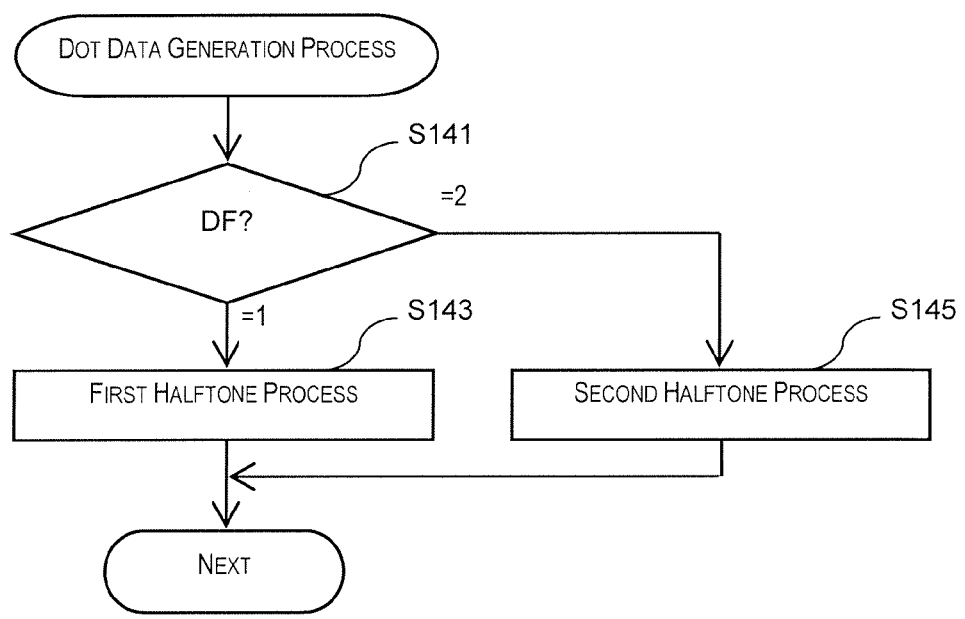
FIG. 28 is a flowchart of the dot data generating process in the fifth embodiment.

The printing process performed by the printer 20 in the fifth embodiment will now be described. FIG. 27 and FIG. 28 are flowcharts of the printing process performed by the printer 20 in this embodiment. The step numbers in the flowchart used to explain this embodiment are the step numbers of the flowcharts in FIG. 27 and FIG. 28. Here, the user operates the control panel 99 to initiate the printing process by performing a printing instruction operation for a predetermined image stored in the memory card MC. When the printing process has been initiated, the CPU 40 first reads and inputs the RGB-formatted image data ORG to be printed from the memory card MC via the memory card slot 98 (Step S110).

When the image data ORG has been inputted, the setting for the paper to be printed is received (Step S115). Here, the user sets the paper size using a paper setting dialog box PDB displayed on the control panel 99. A particular paper size (such as A4) is set as the default setting, and the default paper size is used unless otherwise indicated by the user. The paper size setting is stored in the PageSize variable, and this is referenced in the subsequent processing. After the paper size has been set, the CPU 40 references the look-up table (not shown) stored in the EEPROM 60, and performs color conversion on the image data ORG from the RGB format to the CMYKLcLm format (Step S120).

When the color conversion process has been completed, the paper side is determined (Step S125). The paper size is determined by referencing a PageSize variable saved in advance. As a result of the paper size determination, the CPU 40 sets the paper quality parameter DF to 1 when the paper size is less than A4 such as in the case of photographic paper (cabinet size, L size, 2L size, and the like) (Step S130). When the paper size is A4 or greater, the value 2 is set in the image quality parameters DF (Step S135). After the dot data generating process has been performed (Step S140), the CPU 40 performs overlapping and interlacing alternatingly aligned with respect to dot data to be printed in a single main scanning unit, harmonized with the nozzle arrangement of the printer 20, the paper feed rate, and other parameters (Step S150). When the overlapping and interlacing have been performed, the CPU 40 performs the processing of a printing unit 43, driving the print head 90, carriage motor 70, and motor 74, and executing the printing (Step S160). The printing process is then completed.

The dot data generating process described above (Step S140) is the so-called halftone process in which data for turning dots ON/OFF for printing (forming or not forming dots) is generated from image data after color conversion. This process is described using FIG. 28. When the dot data generating process has been started (Step S140), the CPU 40 first references the image quality parameter DF (Step S141). When the image quality parameter DF is 1, the first halftone process is performed (Step S143). When the image quality parameter DF is 2, the second halftone process is performed (Step S145). Whether the first or second halftone process is performed, the CPU 40 performs the processing of the dot data generating unit 42 and performs halftone processing in which the image data is converted to dot data of each color. Only the content of the process is different. In this embodiment, the first and second halftone process are performed using the dither method. The first and second dither mask 61, 62 used in this process are repeatedly applied in the main scanning direction and the secondary scanning direction depending on whether the inputted data is aligned in the main scanning direction or the secondary scanning direction. The first and second halftone processing in this embodiment is controlled so that the generated dot data has predetermined characteristics. The content of the control depends on the characteristics of the first and second dither masks 61, 62. The first and second halftone process are not limited to binary ON/OFF dot processing. It can also be multi-value processing such as ON/OFF processing of large dots and small dots. Also, the image data provided to the halftone process can be obtained from image processing such as resolution conversion processing and smoothing processing.

When the printing process is executed (FIG. 27, FIG. 28), dot formation is performed using either the first dither mask 61 or the second dither mask 62 depending on the paper size. The printer 20 forms dots by ejecting ink from the print head on a plurality of different timings (in other words, forward action and reverse action) in the common print region of the print medium while changing the ink ejection position with respect to the print medium, and a printed image is outputted in which the dots formed during the forward action and the dots formed during the reverse action are aligned with each other.

E-2. Halftone Processing

The following is a description of the characteristics of the halftone process in the fifth embodiment. In this embodiment, the first or second halftone process is performed depending on the set size of the paper (Step S143 or Step S145). The first halftone process shown as Step S143 in FIG. 28 will be described first. In the first halftone process, whether or not to form a dot in a pixel position is decided by comparing the gradation values of a pixel belonging to a first pixel group and a pixel belonging to a second pixel group to the first dither mask 61 stored in the EEPROM 60. The first dither mask 61 used in the first halftone process is a so-called blue noise mask, and a dot ON/OFF decision is made by comparing the gradation value of image data to the threshold value for the corresponding position in the first dither mask 61.

The second halftone process will be described next. In the second halftone process (Step S145), dot data is also generated via a comparison to a threshold value in the dither mask. However, a second dither mask 62 is used in the second halftone process. The second dither mask 62 in this embodiment has the same content as the dither mask 62 in the first embodiment (see FIG. 1), and the generation method is the same as the generating method used by the dither mask in the first embodiment (FIG. 12). Therefore, further description has been omitted.

E-3. Effect of the Fifth Embodiment

In the printer 20 of the fifth embodiment having the configuration described above, image data ORG is received, and the control unit 30 performs the processing shown in FIG. 27 and FIG. 28 to print an image on printing paper P. In a case in which the size of the printing paper P is A4 or less, for example, photograph size (L-size, or the like), halftone processing is performed and dot data generated using the first dither mask 61 which has blue noise characteristics. In a case in which the size of the printing paper P is A4 or greater, halftone processing is performed and dot data generated using the second dither mask 62 in which the probability of dots being formed in paired pixels is high. In both cases, the data is converted to the final dot distribution. As a result, in a case in which the paper size is small, an image can be formed with an especially sparse dot distribution and superior graininess in the low gradation region. In a case in which the paper size is large, the second dither mask 62 is used to increase the quality of an A4-size image to the human eye, which is usually viewed from a greater distance than a photograph-sized image. Here, the change in the percentage of paired dots formed in the 0-127 gradation region hardly changes, and density unevenness is less likely to occur.

E-4. Modification Examples of Fourth and Fifth Embodiments

In this embodiment, the printer 20 shown in FIG. 25 performs the printing process from the input of image data to the printing itself. However, a printer 20 can be connected to a computer PC, and the processing from Step S110 to Step S140 in FIG. 26 and the processing from Step S110 to Step S150 shown in FIG. 27 and FIG. 28 can be performed by the computer PC. In this case, the paper size determination (Step S125 in both FIG. 26 and FIG. 27) can be performed by checking a member number managed by a printer driver.

Because printing can be performed smoothly between a computer PC and a printer using a general operating system such as Windows™, the information needed for printing can be managed as a collection of parameters called "members". The following are some of the members used in Windows™
    dmOrientation (paper orientation)
    dmPaperSize (paper size)
    dmPaperLength (paper length)
    dmPaperWidth (paper width)
    dmPosition (paper position)
    dmScale (scaling)
    dmCopies (number of printed copies)
    dmDefaultSource (default paper tray)
    dmPrintQuality (printing resolution)
    dmColor (color or monochrome printing in color printer)
    dmDuplex (enable two-sided printing)
Because these members are set in a process such as print setup, a print driver or the like can determine the paper size setting by referencing these members.

In a case in which the first and second halftone processing in the printing process shown in FIG. 26, FIG. 27, and FIG. 28 are performed by a computer PC, when the determination in Step S125 is made, dmPaperSize (paper size) is called up from the members, the paper size is determined from the value, and either the first or second halftone process is executed accordingly. While the viewing distance for printed material depends largely on paper size, it can also depend on the size of the region in which the image is actually printed. Therefore, in the determination made in Step S125, the following elements can also be considered instead of the paper size alone. The determination can be made using any one of these elements alone or using any combination of elements.
    (A) Paper Size
    (B) Paper Orientation (Landscape or Portrait)
    (C) Paper Margins (Margins)

(D) Printing Resolution (Resolution Widthwise, Resolution Lengthwise)
(E) Aspect of Region For Printed Image
(F) Aspect Ratio of Image to be Printed (Aspect)
(G) Paper Type (Plain Paper, Fine Paper, Photo Paper, Overhead Projector Sheet, and the like)

Based on these elements used alone or in combination, the first dither mask 61 is used when the printing region is small, and the second dither mask 62 is used when the printing region is large. Also, the first dither mask 61 can be used when the resolution is low, and the second dither mask 62 can be used when the resolution is high. This is because, when the resolution is high, the printing process takes more time, ink is absorbed by the print medium (such as paper) during printing using ink, the print medium stretches, cockling occurs, and a shift in the landing position of ink droplets is more likely to occur.

The type of dither mask to be used or a reference pointer for the dither mask can also be prepared as one of the members. When the paper size member is set, the member indicating the type of dither mask or the member indicating the reference pointer for the dither mask can be changed directly in accordance with this value.

F. Sixth Embodiment

F-1. Dither Mask

The following is a description of the sixth embodiment of the present invention. The hardware of the printer 20 in the sixth embodiment is the same as that in the fourth and fifth embodiments (see FIG. 25). Also, the printing process performed by the printer 20 is the same as that of the fourth and fifth embodiments (FIG. 26, FIG. 27, FIG. 28) except for the first dither mask 61 used in the first halftone process. In the sixth embodiment, the first and second halftone processing is performed using the so-called dither method.

The following is a comparison of the characteristics of the first dither mask 61 in this embodiment and the first dither mask 61 in the fourth and fifth embodiments.
(1) Similarities:
The size of the dither mask is 64×64 in both.
A blue noise mask giving priority to dispersion properties is used.
(2) Differences
In the fourth and fifth embodiments, the threshold values for the 64×64 dither mask were prepared as a simple blue noise mask. By contrast, the dither mask in the sixth embodiment is created to take into account the dispersion properties of dots in the first pixel group to which the dots formed during forward action of the print head 90 belong and the dots in the second pixel group to which the dots formed during reverse action of the print head 90 belong.

These differences will now be described. An image is formed by the printer 20 from dots formed during forward action of the print head 90 and dots formed during reverse action of the print head. Therefore, the distribution of dots in an image obtained using certain gradation values is a distribution of dots formed during both the forward action and reverse action of the print head 90. Conventionally, the threshold values for the dither mask are decided while targeting improved dispersion properties for the dots in this case. By contrast, the dither mask used in the sixth embodiment takes into account the dispersion properties of dots in the first pixel group to which the dots formed during forward action of the print head 90 belong and the dots in the second pixel group to which the dots formed during reverse action of the print head 90 belong. In other words, the dither mask used in the sixth embodiment, as shown in FIG. 16, takes into account the dispersion properties of the dots themselves formed during forward action (FIG. 16A) and the dispersion properties of the dots themselves formed during reverse action (FIG. 16B) when a particular image is formed. A method for generating such a dither mask is described below, but any method able to generate a dither mask with these characteristics can be used.

A printer 20 of the sixth embodiment using a dither mask with these characteristics is able to sufficiently suppress deterioration in image quality even when a shift occurs in the position of dots formed during the forward action and reverse action of the print head 90. This is because a dither mask is used which takes into account the dispersion properties of the first pixel group to which dots formed during forward action of the print head 90 belong and the second pixel group to which dots formed during reverse action of the print head 90 belong. In order to ensure the dispersion properties of the dots belonging to both groups even when a shift occurs in the formation position of dots during forward action and reverse action, a slight decrease in the dispersion properties of the dots remains in a case in which the dots of both groups overlap in the common region. This is because the graininess in a case in which the dots belonging to the two pixel groups are combined indicates a strong correlation with the graininess of the individual dots belonging to each pixel group.

F-2. Dither Mask Generating Method

Figure 29:
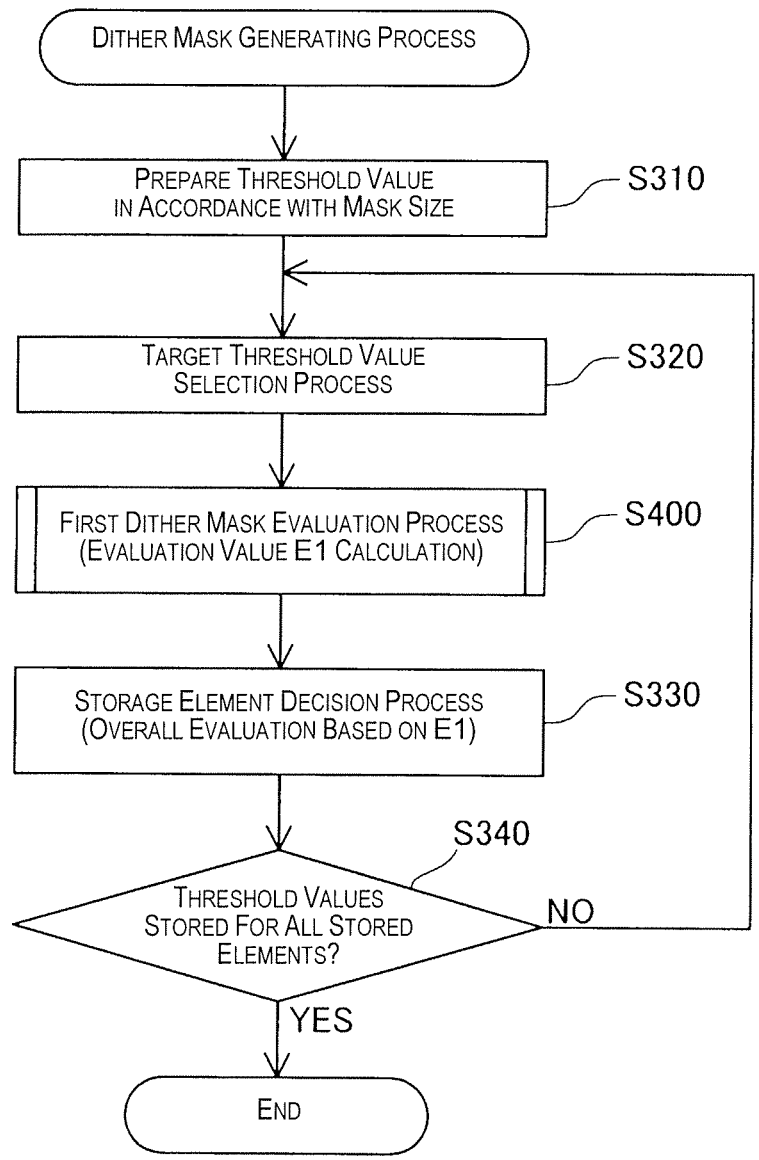
FIG. 29 is a flowchart of the dither mask generating process in the sixth embodiment.

The steps in the generation method for a first dither mask 61 with these characteristics are shown in FIG. 29. The step numbers in the flowchart used to explain this embodiment are the step numbers of the flowchart in FIG. 29. As shown in the figure, when generating the first dither mask 61, threshold values are first prepared based on the size of the first dither mask 61 (Step S310). In this embodiment, the size of the first dither mask 61 is 64×64. However, the description has been simplified by using an 8×8 sized mask with 64 storage elements. In Step S310, threshold values 0-63 are prepared. In other words, a threshold value is prepared for each storage element.

When the threshold values have been prepared, the target threshold value selection process is performed (Step S320). In the target threshold value selection process, a threshold value is selected as a target threshold value among the prepared threshold values 0-63 not yet stored in a storage element. In this embodiment, the target threshold values are selected from among the prepared threshold values in successive order from the smallest to the largest. As shown in FIG. 18, in a case in which threshold values 0-3 have already been stored in storage elements constituting the dither mask by performing the steps described below, the target threshold value selected in the next Step S320 is value 4.

When the target threshold values have been selected, the first dither mask evaluation process is performed (Step S400). In the first dither mask evaluation process, in a case in which a target threshold value is to be stored in a storage element that is not yet storing a prepared threshold value, an evaluation value E1 is calculated for each empty storage element which indicates the extent of dot dispersion in a dot formation pattern indicating the arrangement of storage elements in which threshold values have already been stored. The calculation method for this evaluation value E1 is described below. However, in this embodiment, a smaller evaluation value E1 indicates better dot dispersion properties and is good from the standpoint of the graininess of the printed image.

Next, the stored element is decided using the evaluation value E1 (Step S330), and it is determined whether or not the deciding process has been completed for all of the storage elements (Step S340). When the process has been performed for all of the storage elements, the process returns to Step S320, and the process described above is repeated. When the first dither mask evaluation process described above has been performed and threshold values have been stored in all of the storage elements (YES in Step S340), the evaluation of the first dither mask 61 has ended, and the dither mask generating process is complete. The first dither mask evaluation process in this embodiment is similar to the first dither mask evaluation process performed in the second embodiment (FIG. 19), so further description has been omitted.

When halftone processing is performed using such a first dither mask 61, the dispersion properties of forward action dots and reverse action dots can be ensured even when there is a position shift between forward action dots and reverse action dots. As a result, the dispersion properties of the dots in the entire image can be ensured, and deterioration in the graininess of the image quality can be suppressed.

The present invention was described above with reference to embodiments, but the invention is by no means limited to these embodiments. The present invention can be realized in a variety of ways in a range that does not change the essentials of the invention. For example, the present invention can be embodied in a printer for monochromatic printing or in a line printer in which print heads are provided in the width direction of the paper. Also, the processing shown in FIG. 4, FIG. 22, FIG. 26, FIG. 27, and FIG. 28 can be embodied by a computer (or server connected to a network) rather than by a printer. In addition, the processing can be realized by hardware (for example, an RIP provided between printers).

In the embodiments, the description was limited to a first and a second pixel group, which are a group of pixels in which dots are formed during forward action, and a group of pixels in which dots are formed during reverse action in bi-directional printing. However, the pixel groups can be established in various ways as long as the printing conditions are different. For example, dots formed during multiple passes of a so-called multi-pass printer in which a raster is created by multiple main scans can be divided into different pixel groups, and the adjacent pixels can be set between each pixel group to control the paired dot incidence. Alternatively, the pixels in which dots are formed by nozzle columns ejecting ink can be divided into groups for each nozzle column.

In addition, the percentage of dots formed during forward action and during reverse action can be changed depending on the configuration used to control the probability of paired dots being formed, or the configuration used to eject ink droplets of different sizes from nozzles to form dots. In a case in which large, medium and small dots are separated or in a case in which dots of different concentrations are separated, the probability of paired dots being generated is preferably controlled using one type of dot from the smallest diameter dot (lightest ink) or using multiple types of dots from the smallest diameter dot (lightest ink). In other words, because those among the various types of dots that are large-diameter dots (the darkest dots) are formed in the high gradation region, the probability of these dots being paired dots need not be controlled.

In the fourth through sixth embodiments, there was switching between two dither masks. However, three or more dither masks can be prepared, and switching can be performed between more than two dither masks depending on the size of the printing region or some other factor. Also, the first halftone process can be performed using another method as long as the process is the same as when a dither mask is used. For example, the halftone process described above using a dither method and the first dither mask can also be realized using the error diffusion method. In processing using the error diffusion method, the arrangement of dots is close to blue noise characteristics. Therefore, halftone processing can be performed using the error diffusion method when the paper size is smaller than a predetermined value or the print region is smaller than a predetermined value, and halftone processing can be performed using a dither mask in which the probability of paired dots being generated is close to $k^2$ when the paper size is greater than a predetermined value or the print region is greater than a predetermined value. This has the same effects as the fourth through sixth embodiments. The second halftone processing can also be realized using the error diffusion method. In this case, a buffer is provided for diffusing the density errors generated by the reference pixel, a counter is provided to count the number of dots formed in adjacent pixels, the excess or deficiency is calculated with respect to the prediction value for paired dots, and this is used to correct the gradation values in the surrounding pixels.

The printing device, printing method, and dither mask generating method of the present invention were described above as embodiments. A printing device in the first and second embodiments controls the number of paired dots using a dither mask to which certain characteristics have been imparted. A printing device in the fourth through sixth embodiments controls the number of paired dots using a dither mask to which certain characteristics have been imparted when the paper size is A4 or greater. Therefore, one can determine whether the invention in the present application has been embodied even when the characteristics of the dither mask have not been analyzed. In other words, in a case in which a dither mask having high dispersion properties is used as shown in FIG. 9, the probability K of paired dots is close to zero in the region of the image with low gradation values (for example, 0-50/255, dot incidence: 0-0.2, and this is very far from $k^2$. Therefore, it can be determined whether the invention in the present application has been embodied in the first and second embodiments by the use of the graininess index shown in Equations (1) and (2), and in the fourth through sixth embodiments by the use of different halftone processing depending on the paper size and by the use of the graininess index shown in Equations (1) and (2), where the dispersion properties in the image are above a predetermined value, and the probability K of paired dots being formed is, for example, $0.21^2 - K - 0.8 \cdot k^2$ relative to the dot incidence k. In a case in which the error diffusion method is used, the noise characteristics are similar to blue noise characteristics. Therefore, it is also easy to determine whether the invention in the present application has been embodied by measuring whether the paired dot incidence is within a predetermined gradation range for the image.

What is claimed is:

1. A printing device for forming dots on a printing medium and printing an image, the printing device comprising:
   a dot data generating unit for receiving image data for an image to be printed, and generating and associating with each pixel dot data indicating whether or not a dot is to be formed on the basis of a gradation value for each pixel forming the image, and
   a printing unit for printing the image, when dots are to be formed on the printing medium in accordance with the dot data, by dividing the formation of dots into a plurality of pixel groups having different printing conditions, and by performing at least a portion of the dot formation using the plurality of pixel groups in a common region; and the distribution of dots formed in the common region has a noise characteristic possessing a peak in the spatial frequency region on a higher-frequency side relative to a low-frequency region at or below a predetermined spatial frequency, in a case where first and second pixels belonging, respectively, to two pixel groups among the plurality of pixel groups are proximal pixels that are near to each other in the common region in a predetermined gradation range in which probabilities k1 and k2 at which a dot is formed in the first and second pixels are such that k1<0.5 and k2<0.5, a probability K of a dot being formed on both of the proximal pixels is set to be close to k1·k2.

2. The printing device of claim 1, wherein
the probability K of a dot being formed in both proximal pixels is set to be closer to k1·k2 in a case in which the size of a printing region in the printing medium is equal to or greater than a first predetermined value than in a case in which the size of a printing region in the printing medium is less than the first predetermined value or a second predetermined value that is smaller than the approximate predetermined value.

3. The printing device of claim 1, wherein
whether or not to form a dot is decided by comparing the gradation value of each pixel to each threshold value of a dither mask prepared in advance; and
the probability K of a dot being formed in both proximal pixels is set to be close to k1·k2 in a case in which the threshold value when determining whether or not to form a dot in the common region has noise characteristics and the first and second pixels are proximal pixels that are near to each other in the common region within a predetermined gradation range.

4. The printing device in claim 1, wherein
the printing unit performs a reciprocating action with respect to a main scanning direction, and prints the image during both main scanning in the forward action and main scanning in the reverse action, and
the first pixel group to which the first pixel belongs is a group of pixels in which dots are formed by main scanning in the forward action, and the second pixel group to which the second pixel belongs is a group of pixels in which dots are formed by main scanning in the reverse action.

5. The printing device of claim 4, wherein
the dots formed by main scanning in the forward action and the dots formed by main scanning in the reverse action are arranged in an alternating manner in both the main scanning direction and a secondary scanning direction intersecting the main scanning direction; and
the proximal pixels are a combination of one pixel and another pixel adjacent to the pixel in the main scanning direction, and a combination of a pixel and another pixel adjacent to the pixel in the secondary scanning direction.

6. The printing device of claim 4, wherein
the dots formed by main scanning in the forward action and the dots formed by main scanning in the reverse action are arranged in an alternating manner in the main scanning direction, and are arranged so that the dots formed by main scanning in the forward action or the dots formed by main scanning in the reverse action are contiguous in a secondary scanning direction intersecting the main scanning direction; and the proximal pixels are a combination of one pixel and another pixel adjacent to one side of the one pixel in the main scanning direction, and a combination of the one pixel and pixels adjacent to the adjacent pixel on either side in the secondary scanning direction.

7. The printing device of claim 4, wherein
the dots formed by main scanning in the forward action and the dots formed by main scanning in the reverse action are arranged in an alternating manner in a secondary scanning direction intersecting the main scanning direction, and are arranged so that the dots formed by main scanning in the forward action or the dots formed by main scanning in the reverse action are contiguous in the main scanning direction; and
the proximal pixels are a combination of one pixel and another pixel adjacent to one side of the one pixel in the main scanning direction, and a combination of the one pixel and pixels adjacent to the adjacent pixel on either side in the main scanning direction.

8. The printing device in claim 1, wherein
the printing unit forms dots while performing main scanning in the main scanning direction, and prints the image by performing the main scanning operation a plurality of times; and
the first pixel group to which the first pixel belongs and the second pixel group to which the second pixel belongs are groups of pixels in which dots are formed during different main scanning operations among the main scanning operations performed a plurality of times.

9. The printing device in claim 1, wherein
the probability K is within the range k1·k2−0.2<K<k1·k2.

10. The printing device in claim 1, wherein
the predetermined gradation range is 0<k1<0.2, and 0<k2<0.2.

11. The printing device in claim 1, wherein
probabilities k1 and k2 are both k, and probability k is close to $k^2$.

12. A printing method for forming dots on a printing medium and printing an image, the printing method comprising:
receiving image data for an image to be printed, and generating and associating, with each pixel, dot data indicating whether or not a dot is to be formed on the basis of a gradation value for each pixel forming the image, and
printing the image, when dots are to be formed on the printing medium in accordance with the dot data, by dividing the formation of dots into a plurality of pixel groups having different printing conditions, and by performing at least a portion of the dot formation using the plurality of pixel groups in a common region; and
the distribution of dots formed in the common region has a noise characteristic possessing a peak in the spatial frequency region on a higher-frequency side relative to a low-frequency region at or below a predetermined spatial frequency,
in a case where first and second pixels belonging, respectively, to two pixel groups among the plurality of pixel groups are proximal pixels that are near to each other in the common region in a predetermined gradation range in which probabilities k1 and k2 at which a dot is formed in the first and second pixels are such that k1<0.5 and k2<0.5, a probability K of a dot being formed on both of the proximal pixels is set to be close to k1·k2.

* * * * *